United States Patent
Kobayashi et al.

(10) Patent No.: US 8,092,939 B2
(45) Date of Patent: Jan. 10, 2012

(54) MANGANESE DRY BATTERY CONTAINING AN ANODE ZINC CAN MADE OF ZINC AND BISMUTH

(75) Inventors: Kazunari Kobayashi, Chiba (JP); Mutsuhiro Maeda, Chiba (JP)

(73) Assignees: Toshiba Consumer Electronics Holdings Corporation, Tokyo (JP); Kabushiki Kaisha Toshiba, Tokyo (JP); Toshiba Home Appliances Corporation, Tokyo (JP)

( * ) Notice: Subject to any disclaimer, the term of this patent is extended or adjusted under 35 U.S.C. 154(b) by 36 days.

(21) Appl. No.: 12/617,232

(22) Filed: Nov. 12, 2009

(65) Prior Publication Data

US 2010/0055561 A1    Mar. 4, 2010

Related U.S. Application Data

(62) Division of application No. 10/584,203, filed as application No. PCT/JP2004/019419 on Dec. 24, 2004, now Pat. No. 7,829,217.

(30) Foreign Application Priority Data

Dec. 25, 2003  (JP) ................................. 2003-431343

(51) Int. Cl.
  *H01M 4/58*   (2010.01)
  *H01M 2/02*   (2006.01)
(52) U.S. Cl. ........ 429/229; 429/224; 429/166; 429/168; 429/163; 420/513
(58) Field of Classification Search .................. 429/163, 429/164, 166, 168, 175, 176, 224, 229; 420/513, 420/514, 523
See application file for complete search history.

(56) References Cited

U.S. PATENT DOCUMENTS

| | | |
|---|---|---|
| 2007/0111096 A1 | 5/2007 | Kobayashi et al. |
| 2007/0134553 A1 | 6/2007 | Kobayashi et al. |
| 2007/0190410 A1 | 8/2007 | Kobayashi et al. |
| 2008/0029189 A1 | 2/2008 | Maeda |

FOREIGN PATENT DOCUMENTS

| | | |
|---|---|---|
| EP | 0 688 056 A1 | 12/1995 |
| JP | 62-229762 | 10/1987 |
| JP | 5-55979 | 8/1993 |
| JP | 06-196156 | 7/1994 |
| JP | 07-045272 | 2/1995 |
| JP | 07-94193 * | 4/1995 |
| JP | 07-094193 | 4/1995 |
| JP | 2000-058045 | 2/2000 |
| WO | WO 00/77868 A1 | 12/2000 |

OTHER PUBLICATIONS

U.S. Appl. No. 12/621,185, filed Nov. 18, 2009, Kobayashi et al.
Japanese Office Action issued on Jan. 11, 2011, in the corresponding Japanese Patent Application No. 2005-515322 (with English Translation).
Japanese Office Action issued on Jan. 11, 2011, in the corresponding Japanese Patent Application No. 2005-516663 (with English Translation).

* cited by examiner

*Primary Examiner* — Raymond Alejandro
(74) *Attorney, Agent, or Firm* — Oblon, Spivak, McClelland, Maier & Neustadt, L.L.P.

(57) ABSTRACT

A virtually lead additive-free but highly reliable and practical anode zinc can for a battery with improved process-ability and corrosion resistance. A manganese dry battery comprising such a zinc can. A manufacturing method for making the zinc can and a battery.

11 Claims, 2 Drawing Sheets

MANGANESE DRY BATTERY CONTAINING AN ANODE ZINC CAN MADE OF ZINC AND BISMUTH

CROSS-REFERENCE TO RELATED CASES

This application is a divisional of U.S. application Ser. No. 10/584,203, filed Jun. 23, 2006 (now U.S. Pat. No. 7,829,217), which is a national-stage filing of PCT/JP04/19419, filed Dec. 24, 2004. Priority is also claimed to Japan 2003-431343, filed Dec. 25, 2003.

TECHNICAL FIELD

This invention relates presents battery anode cans made from low-pollution active material where lead is not used or not added to zinc, and manganese dry batteries thereby.

BACKGROUND OF THE INVENTION

Conventionally and currently general manufacturing method uses lead by adding it to zinc the main active material for battery anode for corrosion resistance against electrolyte. Especially in batteries with neutral to acid electrolyte such as manganese dry batteries 0.15 to 0.50 percent by mass (%) of lead is added to anode zinc.

Further, addition of lead is for process ability of a zinc sheet. Anode zinc cans of cylindrical manganese dry batteries are generally made by extrusion molding of a zinc sheet of anode material in a heat from 100 degrees Centigrade to 260 degrees Centigrade, and an anode zinc plate for the laminated dry battery 6F-22 is made by punching a thinly rolled zinc sheet into a designed shape. But a pure zinc sheet is hardly extruded or punched to produce usable cans or plates. Therefore lead is added to help also process ability. But lead is one of environmental hazardous materials, so supply of anode zinc material without lead is now urgently needed and development of such materials is conducted enthusiastically.

Impact extrusion or deep drawing of a rolled zinc sheet is a way to make an anode can with a bottom cover. Such processes are possible cause of electrolyte leakage when a battery is excessively discharged and a zinc can partly wears extraordinarily. How to solve this problem of electrolyte leakage is a crucial issue for quality improvement of manganese dry batteries. Another environmental crucial issue is scrapping batteries (lead therein) in or together with home wastes.

Realization of lead additive-free active material for a zinc battery anode is a paramount necessity of today.

Technical development has been conducted for a long time to create active material for a zinc battery anode without adding lead and yet ensuring corrosion resistance and enough process ability. But so far none is successful to fulfill both requirements, and a battery lead additive-free is not available. Shortcomings of the technical development are in corrosion resistance and in process ability.

For example, corrosion test; the method is to dip a sheet of an anode zinc sheet into battery electrolyte and measure decrease of the sheet weight on picking out of electrolyte for evaluation of material corrosion resistance. It is an adequate method for material evaluation, but wearing process of the anode zinc material by discharge reaction of a battery is not taken into account which is essential factor to consider practical use of a battery. And consideration lacks as to impurities by elution from cathodes material, a compound of manganese dioxide, electrolyte and conductive material. As for process ability development works did many about material hardness, deformation and dent after extrusion or deep drawing but the works have been unable to find a material fault causing microscopic defects.

There is a development case presenting use of an alloy of zinc adding some or at least any one of indium, aluminum, and gallium instead of lead for a battery anode can. (Reference: JP6-196156A) This technology was developed focusing on crystal grain diameter and corrosion resistance of anode zinc material.

The technology enables to produce a same level of material as lead added zinc material by maximum addition of indium, in corrosion resistance as 0.82 mg/cm$^2$. The test electrolyte contains inevitable impurities such as Ni, Co, and Cu. And, the technology lacks anticipation of impurities which elute from the cathode compound material when a battery is stored for a long period or at the time of discharge halt in an intermittent discharging. Because of aforesaid flaw, it is difficult to deem the anode material by this technology useable enough for practically marketable batteries.

Another known technology is a method to prevent corrosion of anode by adding bismuth to active material for zinc anode while limiting amount of nickel, cobalt, and copper to add to manganese dioxide, the active material for cathode. (Reference: JP7-45272A) A problem with this technology is inability of controlling cracks among material crystals entailed during process of anode zinc cans, being little study seems to have been made about microscopic structure of anode materials. So this method is not competent enough to ensure reliability of battery quality for a long time. By this method corrosion due to impurities eluted from the cathode compound material is deemed not to be sufficiently deterred from growing, so battery quality can not be stable. In applying this method, anticorrosion material was necessary to add to the anode zinc can material, for no consideration is given in the method as to reactive wearing process of a can to be caused by discharge reaction of a battery.

DISCLOSURE OF THIS INVENTION

This invention offers a highly reliable active material for battery anode, battery anode cans, anode zinc sheets, and manganese dry batteries thereby.

An example of implementing this invention presents (1) an active material for battery anode which consists of zinc for major ingredient and does not contain lead virtually. The material features low decrease of a can wall less than or equal to 3.8 mg after 10 cm$^2$ piece of the sheet from a can is placed still in a vessel filled with electrolyte which concentration is nickel 2.9 ppm, cobalt 0.40 ppm, and copper 0.86 ppm, and the vessel is placed in a constant temperature water chamber in 45 degrees Centigrade for 66 hours; or (2) to use more than or equal to 99.99% concentration of zinc, and apply a material which major ingredient is zinc with additive compound of bismuth by more than or equal to 0.01 percent by mass and less than or equal to 0.7 percent by mass, or alternatively a material with major ingredient zinc, additive bismuth more than or equal to 0.01 percent by mass less than or equal to 0.7 percent by mass, magnesium more than or equal to 0.0003 percent by mass less than or equal to 0.03 percent by mass, and more than or equal to 0.001 percent by mass less than or equal to 0.05 percent by mass of at least one element selected from zirconium, strontium, barium, indium and aluminum; or (3) to make anode zinc plates by punching out of into given shapes a thinly rolled sheet from the anode active material of zinc with bismuth added. And, to manufacture manganese dry batteries using anode containers which is made by extrusion in a temperature of 120 degrees Centigrade to 210 degrees Centigrade; or (4) a manufacturing method of manganese dry batteries featuring use of to make anode zinc plates by punching into given shapes out of very thinly rolled of a sheet from the anode active material of zinc with additive of bismuth more than or equal to 0.01 percent by mass less than or equal to 0.7 percent by mass, magnesium more than or equal to 0.03 percent by mass and at least any one from zirconium, strontium, barium, indium, and aluminum by more than or equal to 0.001 percent by mass and less than or equal to 0.05 percent by mass. And, to manufacture manganese dry batteries using anode plates made by extrusion of a thinly rolled sheet in a heat of 100 degrees Centigrade to 250 degrees Centigrade; or (5) a manufacturing method of battery anode cans featuring manufacture of battery anode containers which anode material consists of average 8~25 μm of grain size by press forming in a heat of 120 degrees Centigrade to 210 degrees Centigrade of zinc alloy anode material of zinc with additive of Bi; or (6) a manufacturing method of battery anode zinc sheet featuring manufacture of anode zinc sheets which anode material consists of average 8~25 μm of crystal grain diameter by thin rolling in a heat of 100 degrees Centigrade to 250 degrees Centigrade of a zinc sheet from alloy of zinc with additive of Bi; or (7) battery anode material which major ingredient is zinc with additive of bismuth without virtually containing lead, featuring Bi additive more than or equal to 0.01 percent by mass less than or equal to 0.7 percent by mass. And a manufacturing method of battery anode cans referred to above (5) or anode zinc sheets as mentioned above (6); or (8) a battery anode cans or anode zinc sheets referred in (5), (6), or (7) above featuring use of additive of Mg more than or equal to 0.0003 percent by mass less than or equal to 0.03 percent by mass besides Bi; or (9) manganese dry batteries with anode cans or anode zinc sheets referred in (5), (6), (7), or (8) above; or

(10) battery anode cans with bottom cover made by forming an active material for battery anode which material composition is zinc 98.7 to 99.8 percent by mass, bismuth 0.01 to 0.7 percent by mass, antimony less than or equal to 1 ppm, lead less than or equal to 70 ppm, and cadmium less than or equal to 20 ppm, featuring metallographic average crystal grain diameter in a range of more than or equal to 8 μm and less than or equal to 25 μm; grain diameter observed on the cutting cross section of the can wall in the direction of the length (height) and the thickness and measured in the unit of grain diameter of projected crystals on a line drawn in the thickness direction on the screen; or

(11) a thin quadrilateral zinc plate made by forming an anode active material which material composition is zinc 98.7 to 99.8 percent by mass, bismuth 0.01 to 0.7 percent by mass, antimony less than or equal to 1 ppm, lead less than or equal to 70 ppm, and cadmium less than or equal to 20 ppm, featuring metallographic average crystal grain diameter in a range of more than or equal to 8 μm and less than or equal to 25 μm; grain diameter observed on the cutting cross section of the can wall in the direction of the length (height) and the thickness, and measured in the unit of grain diameter of projected crystals on a line drawn in the thickness direction on the screen; or

(12) a battery anode can mentioned in (10) above or a battery anode sheet mentioned in (11) made from an anode active material mentioned in (11) but with further additive of magnesium 0.0003 to 0.3 percent by mass; or

(13) a battery anode can referred in (10), (11), or (12) above, featuring metal crystal existing in a range of 200 μm width from the outer surface of the anode can and vertically epitaxial against the length height direction which crystal grain diameter is average (O), and metal crystal existing in a range of 200 μm width from the inner surface of the can which crystal's metallographic average grain diameter is (I); the grain diameter as observed on the cutting cross section of the can in the length (height) and thickness direction and measured in the unit of the projected grain diameter on a line drawn in the thickness direction featuring; the ratio of (O/I) is 1.0 to 1.4; or

(14) a manganese dry battery featuring use of a cylindrical battery anode can with bottom cover made by forming an active material for battery anode which composition is zinc 98.7 to 99.8 percent by mass, bismuth 0.01 to 0.7 percent by mass, antimony less than or equal to 1 ppm, lead less than or equal to 70 ppm, and cadmium less than or equal to 20 ppm, and featuring metallographic average crystal grain diameter in a range of 8 μm to 25 μm; grain diameter observed on the cutting cross section of the can wall in the length (height), and the thickness direction and measured in the scale of the grain diameter of projected crystal on a line drawn in the thickness direction on the screen; and

(15) a 6F22 laminated dry battery featuring use of a battery anode plate made of an anode zinc sheet from an anode active material which material composition is zinc 98.7 to 99.8 percent by mass, bismuth 0.01 to 0.7 percent by mass, antimony less than or equal to 1 ppm, lead less than or equal to 70 ppm and cadmium less than or equal to 20 ppm; the zinc sheet made by rolling the material to the thickness of 0.2 to 0.7 mm; the anode plate made by punching the zinc sheet into the given quadrilateral shape; the metallographic average crystal grain diameter in a range of 8 μm to 25 μm; grain diameter observed on the cutting cross section of the punched plate in the thickness (height) direction and measured in the scale of projected grain diameter of projected crystal on a line drawn in the thickness direction on the screen.

DETAILED DESCRIPTION OF THE PREFERRED EMBODIMENTS

Following is the detailed description of the embodiments of this invention.

A manganese dry battery consist of active material for anode which major ingredient is zinc, active material cathode which major is manganese dioxide, and electrolyte which major ingredient are zinc chloride and ammonium chloride; three are elements to produce electricity. The battery has the structure like a brief cross section as described in FIG. 1 of the drawing. Around a carbon rod (FIG. 14), the cathode current-collector, and the seal (FIG. 15) asphalt sealing material or chemically synthesized material is filled in order to shut off air oxygen entering through a gap between the press fitted carbon rod (FIG. 1-4) and the seal (FIG. 1-5).

(Cathode)

A cathode for a manganese dry battery in the embodiment of this invention can be made from a cathode active material with manganese dioxide for major ingredient, adding carbon-related material and electrolyte for conductivity improvement. As for manganese dioxide, natural manganese dioxide, chemical processed manganese dioxide, and electrolytic manganese dioxide is useable, and any of manganese dioxide available on the market is applicable to implement this invention as far as the material is specified for manganese dry batteries.

For carbon-related material useable is acetylene black or graphite, any of those normally used for conductive material for batteries.

Regarding electrolyte, those generally and publicly known as battery electrolyte can be used; zinc chloride or ammonium chloride solution. But preferable is to apply same electrolyte as used in the manganese dry battery described herein after.

(Anode)

An anode for a manganese dry battery consists of zinc for major anode active material; the material is molded cylindrically into an anode can. For quadrilateral laminated dry battery 6F22, the material is rolled into a thin sheet and the sheet is punched to quadrilateral plates to make a zinc container.

If a bad ductile material for rolling (or deep-drawing) ability is applied to make zinc cans, forming process entails large cracks on anode cans or plates, which are unusable for batteries. Such an inferior material, if it is used to make zinc plates for 6F22, becomes a cause of cracks at the both sides of a zinc sheet by rolling to thin wall; the plates are unusable and material yield in production is bad. That is the reason of adding lead to zinc in a conventional common practice of. This invention obsoletes lead as additive, and instead proposes a method of press forming and rolling preventing from cracks by adequately setting up processing parameters. Lead has been also used to guard zinc material from corrosion by electrolyte. This invention recommends to apply such element as bismuth instead lead to improve corrosion resistance.

An anode of above-mentioned quality is obtainable from an anode material by using bismuth-added alloy and by optimizing corrosion-resistant property, fabrication method, or crystal structure.

Following explains Anode A, Anode B, and Anode C as recommendable examples for embodying this invention.

(Anode A)

The Inventor's study detected significant correlation between reliability of a battery with an anode from cadmium-added zinc alloy and decrease amount by corrosion of the battery anode. A test of corrosion-decrease under conditions close to actual use of a battery produced a result that an anode material which gave good test data showed competent effect in reliability of the battery. This means that; material easily corrodible with electrolyte is essentially not applicable to batteries. Important is realistic effective test method to evaluate corrosion resistance of materials to select.

This invention proposes a corrosion testing in a mode closer to practical usage by applying electrolyte with addition of particular material. That enabled the Inventor's team to decide optimum material to use.

The active anode material in the embodiment of this invention is zinc as major ingredient with addition of bismuth. Preferable amount of bismuth to add is within a range from 0.01 percent by mass to 0.7 percent by mass. An amount less than 0.01 percent by mass is short to effect corrosion resistance. And, an amount more than said range does not give an effect for the amount added, and deteriorates discharge characteristic.

Specific amount of additive bismuth preferable depends on the kind of manganese dioxide to be mixed into cathode compound as the cathode active material. In case of natural manganese dioxide which usually contains much of impurities, addition of bismuth is required more than or equal to 0.10 percent by mass of the zinc amount. Incase of electrolyte manganese dioxide which usually contains very little impurities, addition of just more than or equal to 0.01 percent by mass gave no problem, according to a test by the Inventor. Addition exceeding 0.7 percent by mass gave no effect or improvement for the amount put in and that proved to be only uneconomical.

In the embodiment of this invention, besides bismuth suitable is to add to zinc any one or two combined of such elements as magnesium, barium, strontium, indium, zirconium, and aluminum. Addition of magnesium or zirconium especially recommendable in respect of enhancing process ability of anode zinc.

Preferable amount of magnesium to add is 0.0003 to 0.03 percent by mass. For an anode can or an anode zinc plate hardness is necessary for secured sealing, and magnesium additive is deemed to be within a range of 0.0003 to 0.03 percent by mass. Excessive addition causes a can or a plate friable and is not desirable.

Preferable amount of those additives as barium, strontium, indium, zirconium, and aluminum is from 0.001 to 0.05 percent by mass. Less amount of those additives than that range is not desirable because cracks may occur on cans and plates if a processing heat rises over 210 degrees Centigrade, a conventional standard level of heat. Additive amount exceeding that range is undesirable, either, for corrosion resistance.

Whereas corrosion test by the conventional method for addition of indium to anode material by 0.1 percent by mass showed a level of corrosion resistance equivalent to that of the material with lead additive, a test this in invention, a practical and convenient method using a publicly available standard impurity additive, revealed a corrosion amount with the same material (indium 0.1 percent by mass) approximately 5 times as much as (21 mg/10 cm$^2$) with the material containing lead. The result meant a battery using the material indium 0.1 percent by mass added might involve practical problems, and in fact the battery made out with this material disclosed short battery life hardly useable, through evaluation test by repetition of discharge and halt.

A preferable average crystal grain diameter of foregoing anode active material is less than or equal to 20 μm. An average crystal grain diameter more than or equal to 20 μm acts to lower corrosion resistance against electrolyte and increase corrosion amount to wear the can wall quickly.

(Manufacturing Method of Anode A)

In the foregoing description, a cylindrical manganese dry battery and a quadrilateral laminated dry battery were taken for example to embody this invention. But embodiment is not restricted to those types. The anode active material is also applicable to board (sheet) types or cylindrical with bottom cover types of batteries.

One of features in embodying this invention is heat control of the material surface in extrusion which is a general process to form a zinc sheet into a cylindrical can with bottom cover. If a material surface temperature exceeds 210 degrees Centigrade, sometimes cracks happen on the material. If the material is processed in lower temperature than 120 degrees Centigrade, dimensions of the finished cans tend to exceedingly vary, which is unacceptable.

Heat control is necessary in narrower range than that for extruding a conventional lead added material (100 degrees Centigrade to 260 degrees Centigrade). However, this heat range (100 degrees Centigrade to 260 degrees Centigrade) is applicable to the anode material with additive of any one of magnesium, zirconium, strontium, and barium to zinc. Likewise, 120 degrees Centigrade to 210 degrees Centigrade is a preferable heat range for rolling process of anode zinc sheets, but a heat range 100 degrees Centigrade to 260 degrees Centigrade can applied to the material with additive of any one of magnesium, zirconium, strontium, and barium to zinc.

Manufacturing process of anode cans is following in embodying this invention.

First: ingot by melting zinc alloy

Second: hot rolling to 4 to 8 mm sheet

Third: blanking a sheet to disk shape or hexagonal pellets

Fourth: impact punching pellets with a round whole die and a cylindrical punch

Anode zinc sheet

First and second: same as above

Third: further hot rolling to 0.3 to 0.7 mm sheet

Fourth: (1) blanking to given shape of plates; or (2) coating either side of the sheet with conductive paint, dry up, and blanking (Corrosion Resistance Test for Anode A)

Following explains about the corrosion resistance test of an anode zinc material.

First: (1) Cut out a 10 cm$^2$ piece of a finished cylindrical can with bottom cover (2) Cut out same size of piece out of other type of anode container for manganese dry battery Second: dipping the cut-out piece in electrolyte as specified above with added nickel 2.9 ppm, cobalt 0.40 ppm, and copper 0.86 ppm in a constant temperature chamber. Laying still for 66 hours in 45 degrees Centigrade.

Third: Measuring an amount of decrease in weight by corrosion

Fourth: Decrease less than or equal to 8 mg

The zinc material O.K.

More than or equal to, (including) 8 mg N.G.

The electrolyte used for above test is composed of 26 percent by mass zinc chloride and 1.5 percent by mass ammonium chloride solved in pure water. Regarding the additives above mentioned nickel, cobalt, and copper, recommended to use the standard liquid generally used for element analysis by atomic absorbance method, which liquid is publicly available and practically convenient to apply.

The amount of nickel, cobalt and copper for the test represents an accelerated test of an anode material for an amount of elution from electrolyte from 100% natural manganese dioxide after storage of a battery for about one (1) year in a normal temperature; the amount of nickel, cobalt and copper is equivalent to elution of the impurities into electrolyte during 10 days in 60 degrees Centigrade constant temperature. The ratio of natural manganese dioxide and electrolyte is approximately 1:2 at this time. Storage a battery for one (1) year in a normal temperature stands for a corrosion test for 66 hours in 60 degrees Centigrade.

This invention presents foregoing corrosion test parameter taking into account abovementioned condition and result.

(Anode B)

In this invention zinc is the major ingredient of anode active material. Bismuth is the additive.

No lead is added. The material's average crystal grain diameter is 8 to 25 μm. The material features superior corrosion resistance and long life property.

Bismuth effects to improve corrosion resistance of zinc when lead is not used. Suitable amount is from 0.01 percent by mass to 0.7 percent by mass, and more preferably more than or equal to 0.1 percent by mass and less than or equal to 0.7 percent by mass. Amount less than or equal to 0.01 percent by mass does not matter in using electrolytic manganese dioxide for cathode active material but that amount deteriorates corrosion resistance and not practical in using natural manganese dioxide for cathode. On the other hand, an amount more than 0.7 percent by mass does not give any extra merit for corrosion resistance just incurring extra material cost. Preferable amount of magnesium to use together is more than 0.0003 percent by mass. A lesser amount than 0.0003 percent by mass is problematic in keeping necessary hardness of cans and plates, while more than 0.03 percent by mass acts to make a zinc sheet undesirably hard causing friability against processing impact.

Forming anode material into anode zinc cans: ingot by casting zinc with additives bismuth and other; rolling ingot to a zinc sheet 4 to 8 mm thick; punching the sheet to pellets; deep-drawing the pellets to cans.

Apply pressure to the punch can be any generally exercised, not specific to making battery cans.

For example, 100 t can be enough for deep drawing pellets of 6 mm thick and 31 mm outer dimension. Processing heat in a range of 120 to 210 degrees Centigrade is suitable for rolling a 4 to 8 mm sheet to a 0.3 to 0.7 mm thin sheet for 6F22 anode zinc plates.

The anode cans and plates including thin one for 6F22 thus made out are free from crack and competently corrosion resistant, being 8 to 25 μm of the metallographic average crystal grain diameter of those cans and plates.

(Anode C)

The material for this case of anode cans and plates is alloy of zinc major material, bismuth, and inevitably contained lead in zinc ground metal, antimony, and cadmium limited to a specified level.

Bismuth additive is for corrosion resistance. Preferable amount to add is 0.01 percent by mass to 0.7 percent by mass.

If natural manganese dioxide which naturally contains much of impurities is used for cathode material, more than 0.1 percent by mass is necessary. If electrolytic manganese dioxide which contains very little impurities, more than or equal to 0.001 percent by mass is adequate. More than 0.7 percent by mass is just uneconomical.

The amount of accompaniment impurities in zinc alloy should be controlled to be within certain limit:

Antimony exceeding 1 ppm deteriorates corrosion resistance, resulting inferior leakage resistant property.

Lead less than or equal to 70 ppm

Cadmium less than or equal to 20 ppm

Mass scraping of manganese dry batteries made from alloy containing the elements beyond those limits may cause significant environmental pollution and must be avoided.

In this embodiment, magnesium can be used as additive element of zinc instead of above-mentioned bismuth.

Magnesium is desirable as a material which makes workability good at the deep drawing production process of anode zinc, and gives the hardness of an anode can.

The amount of the magnesium to blend has a desirable range more than or equal to 0.0003 percent by mass less than or equal to 0.03 percent by mass. When the addition of magnesium is less than the above-mentioned range, the hardness of the material obtained will be conventionally inferior to the hardness of a material, and is disadvantageous. On the other hand, when the addition of magnesium exceeds the above-mentioned range, it is disadvantageous at the point that material hardness becomes hard too much and becomes weak to the impact at the time of processing.

Average crystal grain diameter of anode active material as foregoing preferable metallographic average crystal grain diameter is from 8 μm to 25 μm. A larger grain length deteriorates corrosion resistance against electrolyte containing impurities and not desirable. Generally known is that smaller crystal grains are, the better for corrosion resistance, thin wall process-ability, and deep-drawing. And, imaginable is to employ such means as quenching in making ingot in order to obtain smaller crystal grains than 8 μm. However, that can be hardly practicable manufacturing mean of manganese dry battery anode zinc material in view of extra capital investment and complexity of work involved for not substantial improvement of the products.

Measuring crystal grain diameter is a job involved in implementing this invention. A grain diameter meant here is the diameter of crystal epitaxial vertically to the length (height) direction of an anode can. Many of crystals are of oval shapes or oval-like shapes, as observed in the metal structure of a zinc can, since the zinc sheet for a can undergoes deep-drawing process. Naturally vertical length and horizontal length of crystal grains are different. But it is possible to measure grain diameter of crystal epitaxial vertically to length (height) direction of a can wall, and to control grain diameter to achieve the effect of this invention. In case of a zinc plate, the work is to measure diameter of the crystal grain epitaxial vertically to both of two flat faces, and to control the value thereof. If the grain diameter is more than or equal to 25.1 µm, enough corrosion resistance is not obtainable. No material with grain diameter less than or equal to 7.8 µm was not available.

This invention deals with O/I ratio of crystal grain diameter as an important improvement point.

Looking at metallographic crystal grain in an area of inside an anode can wall (the side contacting the separator: I), within 200 µm from the contacting point, and the same in the area of out of the can wall (the side contacting the insulating cover tube: O) 200 µm from the outer surface. The lesser O/I ratio is the smaller variation of material property is; caliber for stability of anode material quality. The O/I ratio has been more than or equal to 1.4 with conventional anode material. The material created with this invention presented the ratio from 1.1 to 1.4. By narrowing variation of crystal grain diameter at both inside and outside anode can wall, even when a battery reaction and wear of the zinc significantly goes on, the anode zinc can keeps its original property longer than a conventional battery one, and maintains corrosion resistance against wear from the inside can wall by discharge reaction.

(Manufacturing Method: Anode C)

Selection of zinc ground metal should be done in respect of purity more than or equal to 99.5%, with impurities (inevitable accompaniment) of lead less than or equal to 70 ppm, antimony less than or equal to 1 ppm, and cadmium less than or equal to 20 ppm.

Melting the zinc ground metal at 470±50 degrees Centigrade, compounding bismuth and churning, ingot is made out. Hot rolling of the ingot at surface temperature 150±50 degrees Centigrade processes a sheet to a designated thickness.

(Making Cans and Plates)

Can:

punching the zinc sheet to hexagonal or circular zinc pellets; deep-drawing the zinc pellet in 120 degrees Centigrade to 210 degrees Centigrade (preferably 150±30 degrees Centigrade) on pellet surface to form a cylinder with bottom cover placing the pellet on a die with round hole and press hitting a cylindrical punch with impact; trimming the formed can to a designated measurement for a battery. If magnesium is added to alloy, temperature of pellet surface can be 100 degrees Centigrade to 250 degrees Centigrade (desirably 150 degrees Centigrade±50 degrees Centigrade), and process ability is same as for sheet and a pellet from a lead-added alloy conventionally used.

Plate for 6F22:

Further rolling a zinc sheet to 0.3 to 0.7 mm thin zinc sheet; coating conductive paint onto either side; drying the coat and punching to a designated shape.

(Electrolyte)

Solution of pure water with zinc chloride or ammonium chloride are used for electrolyte of manganese dioxide dry batteries. Mixture of the two materials can be used. Concentration in a range generally practiced is applicable: mixture of 20 to 30 percent by mass zinc chloride solution plus 1.0 to 3.0 percent by mass ammonium chloride solution. Deviation from such a range of concentration might deteriorate leakage proof or discharge characteristic of the battery.

(Separator)

Separator is made of separator paper alike craft paper with a coat of wet expandable paste to hold back electrolyte.

Suitable paste is any of natural starch, chemical starch, gua-gum or synthesized paste.

(Manufacturing Method of a Battery)

In embodiment of this invention, a manganese dry battery is made in a following way. But that is an example method, and different methods are applicable as far as they are in line of principle and context of this invention.

After weighing cathode active material which has manganese dioxide for major substance, and weighing conductive material such as acetylene black or graphite, dry compound these materials. Then, spray electrolyte to the mixed material, and wet compound the mixed material to form the cathode material compound powder.

Make cylindrical shaped zinc can with bottom by press forming the above-mentioned zinc alloy of this embodiment at the temperature between 100 degrees Centigrade and 250 degrees Centigrade. Insert a cylindrical separator and a dish shaped bottom insulating paper into the inner wall of the zinc can, and insert formed cathode compound into the cylindrical separator and a dish shaped bottom insulating paper. Mount a piece of pressure paper receiving atop the compound, and press so as to adhere the zinc can, the separator and the cathode compound tightly each other. After that, press inserting a carbon rod which will be the current collector into the center of cathode compound, and make the separator wet by the electrolyte eluted from the cathode. Then coat sealing material onto the contacting faces of a plastic sealing plate and the carbon rod. After putting the sealing plate onto the can opening, put a bottom cover plate for the negative terminal and a bottom ring onto the can bottom. Cover the battery overall with a piece of heat shrink tube. After putting the positive terminal plate contacting the carbon rod and plastic seal, crimp seal whole can with the medium of a insulating ring. That completes a manganese dry battery. Make a zinc sheet 0.5 mm thick by rolling zinc alloy of this embodiment in 100 degree Centigrade to 250 degree Centigrade. Coat the sheet with conductive material and dry up. Then, punch the sheet to the designated structure of plate. form a piece of plastic tube to cup shape, therein putting the zinc plate to. Insert of an adhesive coated separator. Form the compound in the shape of the pellet, and fill them above the separator. Pressing the compound, shrinking the tube, a cell is made out. After laminating 6 cells and tightening overall with the shrink tube, compress bonding the bottom and top terminal onto the top and the bottom of the laminates of 6 cells, and shrinking the tube further. Put the whole into a metal jacket together with a current collection strip, and clip sealing the upper and the lower opening. That completes a quadrilateral laminated manganese dry battery.

EXAMPLE A

Following is detailed description of an example.

(1) Obtained was a battery anode zinc material from a lot of zinc ground metal purity more than or equal to 99.99 percent by mass, without adding lead but adding specified amount of bismuth or bismuth plus strontium, or bismuth plus barium, or bismuth plus zirconium. The zinc ground metal inevitably contained impurities such as copper, iron, and cadmium on the ppm order.

(2) Made were zinc pellets in designated dimensions out of a sheet made by hot rolling of the zinc alloy.

(3) Made were zinc cans 0.35 mm thick with bottom cover out of the zinc pellets by deep-drawing. Surface temperature of the work material was measured with laser pointer of Yokogawa digital heat emission thermometer 530/04.

Visually inspected finish condition of the cans, and using a microscope observed was surface condition, dent or cracks. Further checked was metal structure and if any or no cracks.

(4) Made out was a R20 manganese dry battery with the zinc can. Then conducted was corrosion test of the zinc material and evaluation of the battery.

(1) Corrosion Test of the Anode Zinc Material (Corrosion Resistance Test)

Prepared were test samples by cutting piece 10 $cm^2$ out of the finished cans; A sample 0.3 mm thick, 10.0 mm wide, 50.0 mm long. Polished was the sample surface up to mirror face with the sand paper #400, #600, #800, #1000 and #1200, degreased, weighed and dipped into the prepared battery electrolyte. Defined the weight decreased after laying still in a constant temperature water chamber filled with electrolyte for 66 hours at 45 degrees Centigrade was defined as the decrease by corrosion. The electrolyte used was normal battery electrolyte consisting of zinc chloride 25 percent by mass and ammonium chloride 2.0 percent by mass by adding standard liquid available in the market containing nickel, cobalt and copper in a composition to adjust concentration of the electrolyte to nickel 2.9 ppm, cobalt 0.40 ppm, and copper 0.86 ppm. To deter oxygen remaining unsolved in the chamber affect electrolyte property, injected was argon gas to bubble for 10 minutes, and that was the designated test liquid.

Tested were 6 samples with the liquid and obtained was average value of corrosion decrease amount (weight).

(2) Evaluation of Battery Property

Following is the composition of the anode compound used for a battery under evaluation.

(I) 50 mass parts of electrolytic manganese dioxide which purity more than or equal to 92% (impurity: copper below 0.0005 percent by mass, iron below 0.02 percent by mass, and lead below 0.0005 percent by mass)

(II) 9 mass parts of acetylene black containing ash 0.01 percent by mass (III) 26 percent by mass of zinc chloride (IV) 49 mass parts of electrolyte consisting 26 percent by mass of zinc chloride, 1.5 percent by mass of ammonium chloride, with nickel 2.9 ppm, cobalt 0.40 ppm, and copper 0.86 ppm to adjust concentration—homogeneous mixture of above: Cathode compound A; or (V) with 10 times as much as impurity amount in (I) to adjust concentration nickel 29.0 ppm, cobalt 4.0 ppm, and copper 8.6 ppm—Cathode compound B; or (VI) without adjusting additives—Cathode compound C The separator prepared is apiece of craft paper coated with chemical starch of, cross linkage ether of cornstarch.

Using the abovementioned anode zinc material, made out was R20 manganese dry battery. The attached drawing 1 describes this battery. 1 refers to the anode zinc can, 2 the separator, 3 the cathode compound, 4 the carbon rod for collecting current, 5 the gasket, 6 the positive terminal, 7 the negative terminal, 8 the insulating tube, 9 outer cover.

Coat the contact faces of the carbon rod 4 and the seal with asphalt seal material to shut out oxygen to enter through a gap between press inserted carbon rod 4 and the gasket 5.

After storing the battery thus made in a constant temperature chamber of 20 degrees Centigrade±2 degrees Centigrade for 10 days and further storing in a constant temperature chamber in 40 degrees Centigrade for 30 days, the battery was discharged with a load of 40 ohm (Ω) for 4 hours a day in a room temperature. Subsequently evaluate the life characteristics at the time of 1.1V, and obtain relative values to 100 a standard index that stands for the characteristics of conventional and currently available batteries. The number of the samples for evaluation was 9 pieces of R20 finished in this work. For comparison and reference purpose made out were same type battery using anode zinc cans which material 0.4 percent by mass of lead was added to and, conventional zinc cans, and one more battery using anode cans which material 0.1% indium was added to and no lead.

Also tried was to make a battery with an anode can which material 0.3% indium added to and no lead, however, too much cracks appeared during manufacturing and no electrode or batteries were obtainable worth while evaluation.

EXAMPLE A1 TO A15, COMPARATIVE EXAMPLE A1 TO A4, AND REFERENCE EXAMPLE A1

The table A1 herein below indicates result of the corrosion test by foregoing method of the anode active materials with different addition of bismuth, indium, magnesium, zirconium, strontium and barium.

TABLE A1

|  | Bismuth Added amount | Added ingredient of amount | Decrease amount by corrosion | Decrease amount by corrosion Unbiased variance value |
|---|---|---|---|---|
| Example A1 | 0.10 | — | 3.8 | 0.0147 |
| Example A2 | 0.20 | — | 2.4 | 0.0110 |
| Example A3 | 0.30 | — | 2.0 | 0.00567 |
| Example A4 | 0.40 | — | 1.6 | 0.00267 |
| Example A5 | 0.50 | — | 1.3 | 0.00667 |
| Example A6 | 0.70 | — | 1.1 | 0.00567 |
| Comparative example A1 | — | — | 12.0 | 1.10 |
| Comparative example A2 | 0.05 | — | 5.8 | 1.14 |
| Comparative example A3 | 1.00 | — | 1.1 | 0.00400 |
| Comparative example A4 | — | In0.10 | 21.0 | 7.10 |
| Reference example A1 | — | Pb0.40 | 4.2 | 0.00187 |
| Embodiment example A7 | 0.20 | Mg0.0003 | 2.4 | 0.0107 |
| Embodiment example A8 | 0.20 | Mg0.001 | 2.5 | 0.00967 |
| Embodiment example A9 | 0.20 | Mg0.003 | 2.6 | 0.0107 |
| Example A10 | 0.20 | Zr0.001 | 2.3 | 0.00800 |
| Example A11 | 0.20 | Zr0.05 | 2.2 | 0.00800 |
| Example A12 | 0.20 | Sr0.001 | 2.8 | 0.0160 |
| Example A13 | 0.20 | Sr0.05 | 3.1 | 0.0107 |
| Example A14 | 0.20 | Ba0.001 | 3.0 | 0.0627 |
| Example A15 | 0.20 | Ba0.05 | 3.9 | 0.311 |

The result shows corrosion decrease less than or equal to 3.9 mg for every example of this invention, whereas the comparative example A1, no additives of bismuth or any, indicates 12.0 mg of decrease. It is obvious that corrosion resistance was significantly improved in the examples.

EXAMPLE A18 TO A32, COMPARATIVE EXAMPLE A6 TO A15, REFERENCE EXAMPLE A3

The anode zinc electrodes were made from materials with additives bismuth, magnesium, or zirconium, processed in different temperatures.

Checked was thickness of the bottom and crack of the cans overall, and obtained result as shown in Table A2.

TABLE A2

|  | Bismuth added amount | Added element & amount | Material temperature in processing | Can bottom thickness average value | Bottom thickness unbiased variance value | Number of crack |
| --- | --- | --- | --- | --- | --- | --- |
| Comparative example A6 | 0.30 | — | 91 | 0.53 | 6.93E-4 | 0 |
| Example A18 | 0.30 | — | 118 | 0.50 | 0.267E-4 | 0 |
| Example A19 | 0.30 | — | 153 | 0.50 | 0.178E-4 | 0 |
| Example A20 | 0.30 | — | 211 | 0.50 | 0.278E-4 | 0 |
| Comparative example A7 | 0.30 | — | 232 | 0.50 | 0.233E-4 | 1 |
| Comparative example A8 | 0.30 | Mg0.001 | 94 | 0.52 | 2.68E-4 | 0 |
| Example A21 | 0.30 | Mg0.001 | 111 | 0.50 | 0.233E-4 | 0 |
| Example A22 | 0.30 | Mg0.001 | 156 | 0.50 | 0.178E-4 | 0 |
| Example A23 | 0.30 | Mg0.001 | 252 | 0.50 | 0.456E-4 | 0 |
| Comparative example A9 | 0.30 | Mg0.001 | 278 | 0.50 | 0.233E-4 | 2 |
| Comparative example A10 | 0.30 | Mg0.003 | 94 | 0.52 | 2.94E-4 | 0 |
| Example A24 | 0.30 | Mg0.003 | 110 | 0.50 | 0.267E-4 | 0 |
| Example A25 | 0.30 | Mg0.003 | 154 | 0.50 | 0.100E-4 | 0 |
| Example A26 | 0.30 | Mg0.003 | 256 | 0.50 | 0.400E-4 | 0 |
| Comparative example A11 | 0.30 | Mg0.003 | 274 | 0.50 | 0.456E-4 | 2 |
| Comparative example A12 | 0.30 | Zr0.001 | 92 | 0.51 | 2.54E-4 | 0 |
| Example A27 | 0.30 | Zr0.001 | 113 | 0.50 | 0.233E-4 | 0 |
| Example A28 | 0.30 | Zr0.001 | 152 | 0.50 | 0.222E-4 | 0 |
| Example A29 | 0.30 | Zr0.001 | 255 | 0.50 | 0.233E-4 | 0 |
| Comparative example A13 | 0.30 | Zr0.001 | 275 | 0.50 | 0.278E-4 | 3 |
| Comparative example A14 | 0.30 | Zr0.05 | 93 | 0.51 | 2.67E-4 | 0 |
| Example A30 | 0.30 | Zr0.05 | 110 | 0.50 | 0.278E-4 | 0 |
| Example A31 | 0.30 | Zr0.05 | 153 | 0.50 | 0.178E-4 | 0 |
| Example A32 | 0.30 | Zr0.05 | 254 | 0.50 | 0.267E-4 | 0 |
| Comparative example A15 | 0.30 | Zr0.05 | 271 | 0.50 | 0.900E-4 | 4 |
| Reference example A3 | — | Pb0.40 | 255 | 0.50 | 0.267E-4 | 0 |

As the result shown in Table A2 proves, the method taken in the examples realized very little variance of the can bottom thickness and very few cracks presenting superior processability.

EXAMPLE A33 TO A43, COMPARATIVE EXAMPLE A16 TO A17, REFERENCE EXAMPLE A4

Evaluation was done for the batteries with anode cans from anode active material with additives of bismuth, indium, magnesium, or zirconium to zinc.

The result is shown in Table A3 below.

TABLE A3

|  | Cathode compound | Bismuth added amount | Added ingredient & amount | Corrosion decrease | Corrosion decrease unbiased variance value | Life relative value | Life relative value unbiased variance value |
| --- | --- | --- | --- | --- | --- | --- | --- |
| Example A33 | C | 0.01 | — | 8.9 | 0.754 | 100 | 1.42 |
| Example A34 | C | 0.10 | — | 3.8 | 0.0147 | 100 | 0.0600 |
| Example A35 | C | 0.20 | — | 2.4 | 0.0110 | 100 | 0.0553 |
| Example A37 | C | 0.30 | — | 2.0 | 0.00567 | 100 | 0.0744 |
| Example A38 | C | 0.40 | — | 1.6 | 0.00267 | 100 | 0.0936 |
| Example A39 | C | 0.50 | — | 1.3 | 0.00667 | 100 | 0.0600 |
| Example A40 | C | 0.70 | — | 1.1 | 0.00567 | 100 | 0.0800 |
| Comparative example A16 | C | — | — | 12.0 | 1.10 | 99 | 2.55 |
| Comparative example A17 | C | — | In0.10 | 21.0 | 7.10 | 95 | 19.1 |
| Reference example A4 | C | — | Pb0.40 | 4.2 | 0.00187 | 100 | 0.0886 |
| Example A41 | C | 0.30 | Mg0.003 | 2.0 | 0.00267 | 100 | 0.0675 |

TABLE A3-continued

|  | Cathode compound | Bismuth added amount | Added ingredient & amount | Corrosion decrease | Corrosion decrease unbiased variance value | Life relative value | Life relative value unbiased variance value |
|---|---|---|---|---|---|---|---|
| Example A42 | C | 0.30 | Zr0.05 | 2.0 | 0.00667 | 100 | 0.0675 |
| Example A43 | C | 0.30 | Zr0.001 | 1.9 | 0.00567 | 100 | 0.0611 |

As Table A3 describes, the evaluation result revealed that the batteries made in embodying this invention have longer life than the batteries from the material omitting additive of bismuth (Comparative example A16) and the material with sole additive of indium (Comparative example A17) to zinc.

And, the life of the batteries by this invention was no less than or equal to that of conventional batteries from the material with lead added to zinc.

EXAMPLE A44 TO A54, COMPARATIVE EXAMPLE A18 TO A19, REFERENCE EXAMPLE A5

Life test of batteries made of;
anode cans from anode active materials with different additives indium, magnesium, zirconium, strontium, or barium, beside bismuth to zinc.
Cathode compound with additives nickel 2.9 ppm, cobalt 0.40 ppm, and copper 0.86 ppm to manganese dioxide.

TABLE A4

|  | Cathode compound | Bismuth added amount | Added ingredient & amount | Corrosion decrease | Corrosion decrease unbiased variance value | Life relative value | Life relative value unbiased variance value |
|---|---|---|---|---|---|---|---|
| Comparative example A18 | A | — | — | 12.0 | 1.10 | 69 | 21.0 |
| Example A44 | A | 0.01 | — | 8.9 | 0.754 | 90 | 30.8 |
| Example A45 | A | 0.10 | — | 3.8 | 0.0147 | 100 | 0.776 |
| Example A46 | A | 0.20 | — | 2.4 | 0.0110 | 101 | 0.138 |
| Example A47 | A | 0.30 | — | 2.0 | 0.00567 | 101 | 0.778 |
| Example A48 | A | 0.40 | — | 1.6 | 0.00267 | 101 | 0.482 |
| Example A49 | A | 0.50 | — | 1.3 | 0.00667 | 101 | 0.778 |
| Example A50 | A | 0.70 | — | 1.1 | 0.00567 | 102 | 0.147 |
| Comparative example A19 | A | — | In0.10 | 21.0 | 7.10 | 66 | 63.8 |
| Reference example A5 | A | — | Pb0.40 | 4.2 | 0.00187 | 100 | 0.251 |
| Example A51 | A | 0.30 | Mg0.003 | 2.0 | 0.00267 | 101 | 0.485 |
| Example A52 | A | 0.30 | Zr0.05 | 2.0 | 0.00667 | 100 | 2.26 |
| Example A53 | A | 0.30 | Sr0.005 | 2.3 | 0.0011 | 101 | 3.11 |
| Example A54 | A | 0.30 | Ba0.05 | 3.7 | 0.126 | 100 | 6.75 |

As Table A4 depicts, the batteries by this invention have life not less than or equal to that of the lead-contained battery (Reference example A5) and have longer life than the batteries of Comparative examples do.

EXAMPLE A55 TO A61, COMPARATIVE EXAMPLE A20 TO A23, REFERENCE EXAMPLE A6

Life test of batteries made of;
anode cans from anode active materials with different additives indium, magnesium, zirconium, strontium, or barium, beside bismuth to zinc.
Cathode compound with additives nickel 2.9 ppm, cobalt 0.40 ppm, and copper 0.86 ppm to manganese dioxide.
Result in Table A5.

TABLE A5

|  | Cathode compound | Bismuth added amount | Added ingredient & amount | Corrosion decrease | Corrosion decrease unbiased variance value | Life relative value | Life relative value unbiased variance value |
|---|---|---|---|---|---|---|---|
| Comparative example A20 | B | 0.01 | — | 8.9 | 0.0754 | 64.7 | 78 |
| Comparative example A21 | B | 0.10 | — | 3.8 | 0.0147 | 100 | 3.28 |
| Example A55 | B | 0.20 | — | 2.4 | 0.0110 | 102 | 2.25 |

TABLE A5-continued

| | Cathode compound | Bismuth added amount | Added ingredient & amount | Corrosion decrease | Corrosion decrease unbiased variance value | Life relative value | Life relative value unbiased variance value |
|---|---|---|---|---|---|---|---|
| Example A56 | B | 0.30 | — | 2.0 | 0.00567 | 101 | 0.944 |
| Example A57 | B | 0.40 | — | 1.6 | 0.00267 | 101 | 1.36 |
| Example A58 | B | 0.50 | — | 1.3 | 0.00667 | 101 | 0.75 |
| Example A59 | B | 0.70 | — | 1.1 | 0.00567 | 102 | 0.500 |
| Reference example A6 | B | — | Pb0.40 | 4.2 | 0.00187 | 100 | 6.00 |
| Example A60 | B | 0.30 | Mg0.003 | 2.0 | 0.00267 | 102 | 2.50 |
| Example A61 | B | 0.20 | Zr0.05 | 2.2 | 0.00800 | 102 | 2.78 |
| Comparative example A22 | B | 0.30 | Sr0.05 | 2.5 | 0.00227 | 98 | 6.78 |
| Comparative example A23 | B | 0.20 | Ba0.05 | 3.9 | 0.311 | 82 | 69.0 |

As Table A5 indicates, the batteries of this invention have life not less that of the lead-contained battery (Reference example A6) and have longer life than the batteries of Comparative examples do.

EXAMPLE A'

Following is detailed description of an example. Obtained was a battery anode zinc material from a lot of zinc ground metal purity more than or equal to 99.99 percent by mass, without adding lead and adding specified amount of bismuth, or bismuth plus strontium, or bismuth plus barium, or bismuth plus magnesium, or bismuth plus zirconium. The zinc ground metal inevitably contains impurities such as copper, iron, and cadmium on the ppm order. Made were zinc pellets in designated dimensions out of a sheet made by hot rolling those said zinc materials. Rolling further this sheet of material to get a thin wall sheet. The sheet of thin wall was checked if finish was O.K and had no crack or dent. Subsequently made out were 50 pieces of 6F22 laminated manganese dry battery using different zinc cans.

Then the result of corrosion test was conducted on the anode zinc materials and characteristic evaluation of materials was recorded with 50 batteries.

(1) Corrosion Test (Corrosion Resistance Check) of Anode Zinc Material Used for Example A'

Test samples were prepared; each 0.5 mm thick, 10.0 mm wide, 50.0 mm long, by cutting out of the 0.5 mm thick zinc sheet made by foregoing process. The samples were polished up to mirror face with the sand paper #400, #600, #800, #1000 and #1200, degreased, weighed and dipped into the prepared battery electrolyte. Defined was the weight decrease after laying still for 66 hours at 45 degrees Centigrade as the decrease by corrosion. The electrolyte used was normal battery electrolyte consisting of zinc chloride 25 percent by mass and ammonium chloride 2.0 percent by mass, adding standard liquid available from market containing nickel, cobalt and copper in a way to adjust concentration of electrolyte to nickel 2.9 ppm, cobalt 0.40 ppm, and copper 0.86 ppm. To deter oxygen remaining unsolved affect electrolyte property, injected argon gas to bubble for 10 minutes. That was the designated test liquid.

Tested 6 samples with the liquid and obtained average value of corrosion decrease.

(2) Evaluation of Material Property by Finished Batteries

Following is the composition of the anode compound used for a battery under evaluation.

(I) 50 mass parts of electrolytic manganese dioxide which purity more than or equal to 92% (impurity: copper below 0.0005 percent by mass, iron below 0.02 percent by mass, and lead below 0.0005 percent by mass)

(II) 9 mass parts of acetylene black containing ash 0.01 percent by mass (III) 26 percent by mass of zinc chloride (IV) 49 mass parts of electrolyte consisting 26 percent by mass of zinc chloride, 1.5 percent by mass of ammonium chloride, with nickel 2.9 ppm, cobalt 0.40 ppm, and copper 0.86 ppm to adjust concentration—homogeneous mixture of above: Cathode compound A; or (V) with 10 times as much as impurity amount in (I) to adjust concentration nickel 29.0 ppm, cobalt 4.0 ppm, and copper 8.6 ppm—Cathode compound B; or (VI) without adjusting additives—Cathode compound C The separator prepared is a piece of craft paper coated with chemical starch of cross linkage ether of cornstarch.

Using the abovementioned anode zinc material, made out 6F22 quadrilateral laminated manganese dry battery. The attached drawing 1 describes that battery.

After storing the battery in a constant temperature chamber of 20 degrees Centigrade±2 degrees Centigrade for 10 days and further storing in a constant temperature chamber in 45 degrees Centigrade for 30 days, the battery was discharged with a load of 620 ohm (Ω) for 2 hours a day in a room temperature. Subsequently evaluated were life characteristics at the time of 6.6 V, and obtained was relative values to 100 the standard caliber representing the characteristic value of conventional and currently available batteries.

For comparison and reference made out were same type batteries using anode zinc cans which material 0.4 percent by mass of lead was added to, conventional zinc cans, and another using anode cans where 0.1% indium was added and no lead.

Also tried to make a battery with an anode can which material 0.3 percent by mass indium was added to and no lead, however, too much cracks appeared during process and no cans or batteries were obtainable worth while evaluation.

EXAMPLE A62 TO A76, COMPARATIVE EXAMPLE A24 TO A27, REFERENCE EXAMPLE A7

Corrosion resistance test was conducted for the anode active materials with additives of bismuth, indium, magnesium, zirconium, strontium, or barium by each amount indicated in Table AA1 below.

TABLE AA1

| | Bismuth Added amount | Added ingredient of amount | Decrease amount by corrosion | Decrease amount by corrosion Unbiased variance value |
|---|---|---|---|---|
| Example A62 | 0.10 | — | 3.9 | 0.0150 |
| Example A63 | 0.20 | — | 2.3 | 0.0112 |
| Example A64 | 0.30 | — | 1.9 | 0.00572 |
| Example A65 | 0.40 | — | 1.7 | 0.00268 |
| Example A66 | 0.50 | — | 1.4 | 0.00681 |
| Example A67 | 0.70 | — | 1.2 | 0.00601 |
| Comparative example A24 | — | — | 12.5 | 1.18 |
| Comparative example A25 | 0.05 | — | 6.0 | 1.15 |
| Comparative example A26 | 1.00 | — | 1.2 | 0.00412 |
| Comparative example A27 | — | In0.10 | 22.2 | 7.50 |
| Reference example A7 | — | Pb0.40 | 4.5 | 0.00190 |
| Example A68 | 0.20 | Mg0.0003 | 2.3 | 0.0118 |
| Example A69 | 0.20 | Mg0.003 | 2.4 | 0.0090 |
| Example A70 | 0.20 | Mg0.03 | 3.8 | 0.0181 |
| Example A71 | 0.20 | Zr0.001 | 2.4 | 0.009 |
| Example A72 | 0.20 | Zr0.05 | 2.1 | 0.007 |
| Example A73 | 0.20 | Sr0.001 | 2.7 | 0.0172 |
| Example A74 | 0.20 | Sr0.05 | 3.0 | 0.0118 |
| Example A75 | 0.20 | Ba0.001 | 3.2 | 0.0712 |
| Example A76 | 0.20 | Ba0.05 | 3.7 | 0.391 |

The result shows corrosion decrease less than or equal to 3.9 mg for every example, whereas the comparative example A24, no additives bismuth or any, indicates 12.5 mg of decrease. It is obvious that corrosion resistance was significantly improved in the examples.

EXAMPLE A77 TO A91, COMPARATIVE EXAMPLE A28 TO A37, REFERENCE EXAMPLE A8

The anode zinc cans were made from materials with additives bismuth, magnesium, or zirconium, processed in different temperature.
Checked thickness and crack of the sheets, and obtained result as shown in Table AA2.

TABLE AA2

| | Bismuth added amount | Added element & amount | Material temperature in rolling | Number of crack |
|---|---|---|---|---|
| Comparative example A28 | 0.30 | — | 99 | 0 |
| Example A77 | 0.30 | — | 121 | 0 |
| Example A78 | 0.30 | — | 161 | 0 |
| Example A79 | 0.30 | — | 222 | 0 |
| Comparative example A29 | 0.30 | — | 241 | 2 |
| Comparative example A30 | 0.30 | Mg0.003 | 95 | 0 |
| Example A80 | 0.30 | Mg0.003 | 113 | 0 |
| Example A81 | 0.30 | Mg0.003 | 161 | 0 |
| Example A82 | 0.30 | Mg0.003 | 255 | 0 |
| Comparative example A31 | 0.30 | Mg0.003 | 281 | 4 |
| Comparative example A32 | 0.30 | Mg0.03 | 96 | 0 |
| Example A83 | 0.30 | Mg0.03 | 112 | 0 |
| Example A84 | 0.30 | Mg0.03 | 161 | 0 |
| Example A85 | 0.30 | Mg0.03 | 261 | 0 |
| Comparative example A33 | 0.30 | Mg0.03 | 281 | 3 |
| Comparative example A34 | 0.30 | Zr0.001 | 95 | 0 |
| Example A86 | 0.30 | Zr0.001 | 114 | 0 |
| Example A87 | 0.30 | Zr0.001 | 156 | 0 |
| Example A88 | 0.30 | Zr0.001 | 261 | 0 |
| Comparative example A35 | 0.30 | Zr0.001 | 282 | 5 |
| Comparative example A36 | 0.30 | Zr0.05 | 94 | 0 |
| Example A89 | 0.30 | Zr0.05 | 112 | 0 |
| Example A90 | 0.30 | Zr0.05 | 163 | 0 |
| Example A91 | 0.30 | Zr0.05 | 255 | 0 |
| Comparative example A37 | 0.30 | Zr0.05 | 273 | 7 |
| Reference example A8 | — | Pb0.40 | 265 | 0 |

As the result shown in Table AA2 proves, the method taken in the examples realized superior process-ability with very few cracks.

EXAMPLE A92 TO A101, COMPARATIVE EXAMPLE A38 TO A39, REFERENCE EXAMPLE A9

Evaluation of the 6F22 batteries with anode zinc plate from anode active material with additives of bismuth, indium, magnesium, or zirconium to zinc.

The result is shown in Table AA3 below.

TABLE AA3

| | Cathode compound | Bismuth added amount | Added ingredient & amount | Corrosion decrease | Corrosion decrease unbiased variance value | Life relative value | Life relative value unbiased variance value |
|---|---|---|---|---|---|---|---|
| Example A92 | C | 0.01 | — | 8.6 | 0.812 | 101 | 1.31 |
| Example A93 | C | 0.10 | — | 3.7 | 0.0152 | 100 | 0.07 |
| Example A94 | C | 0.20 | — | 2.2 | 0.0111 | 100 | 0.0612 |
| Example A95 | C | 0.30 | — | 2.1 | 0.00628 | 100 | 0.0752 |
| Example A96 | C | 0.40 | — | 1.7 | 0.00270 | 100 | 0.102 |

TABLE AA3-continued

| | Cathode compound | Bismuth added amount | Added ingredient & amount | Corrosion decrease | Corrosion decrease unbiased variance value | Life relative value | Life relative value unbiased variance value |
|---|---|---|---|---|---|---|---|
| Example A97 | C | 0.50 | — | 1.5 | 0.00691 | 100 | 0.0618 |
| Example A98 | C | 0.70 | — | 1.2 | 0.00612 | 100 | 0.0813 |
| Comparative example A38 | C | — | — | 12.8 | 1.21 | 98 | 2.68 |
| Comparative example A39 | C | — | In0.10 | 23.0 | 8.11 | 92 | 21.1 |
| Reference example A9 | C | — | Pb0.40 | 4.5 | 0.00191 | 100 | 0.0891 |
| Example A99 | C | 0.30 | Mg0.03 | 2.1 | 0.00278 | 100 | 0.0715 |
| Example A100 | C | 0.30 | Zr0.05 | 2.2 | 0.00678 | 101 | 0.0782 |
| Example A101 | C | 0.30 | Zr0.001 | 1.7 | 0.00612 | 100 | 0.0681 |

As Table AA3 describes, the evaluation result revealed that the batteries made in embodying this invention has longer life than that of the batteries of the material without additive of bismuth (Comparative example A38) and the material with sole additive of indium (Comparative example A39) to zinc.

And, the life of the batteries by this invention was not less than or equal to that of conventional batteries from the material with additive of lead to zinc.

EXAMPLE A102 TO A112, COMPARATIVE EXAMPLE A40 TO A41, REFERENCE EXAMPLE A10

Life test of batteries made of;
anode zinc sheet from anode active materials with different additives indium, magnesium, and zirconium beside bismuth to zinc.
Cathode compound with additives nickel 29 ppm, cobalt 4 ppm, and copper 8.6 ppm.
Result in Table AA4.

TABLE AA4

| | Cathode compound | Bismuth added amount | Added ingredient & amount | Corrosion decrease | Corrosion decrease unbiased variance value | Life relative value | Life relative value unbiased variance value |
|---|---|---|---|---|---|---|---|
| Comparative example A40 | A | — | — | 12.8 | 1.25 | 72 | 22.5 |
| Example A102 | A | 0.01 | — | 9.1 | 0.812 | 94 | 31.9 |
| Example A103 | A | 0.10 | — | 3.9 | 0.0156 | 100 | 0.716 |
| Example A104 | A | 0.20 | — | 2.2 | 0.0121 | 100 | 0.148 |
| Example A105 | A | 0.30 | — | 1.9 | 0.00612 | 101 | 0.785 |
| Example A106 | A | 0.40 | — | 1.7 | 0.00287 | 100 | 0.491 |
| Example A107 | A | 0.50 | — | 1.4 | 0.00691 | 101 | 0.812 |
| Example A108 | A | 0.70 | — | 1.2 | 0.00611 | 101 | 0.161 |
| Comparative example A41 | A | — | In0.10 | 22.8 | 8.12 | 71 | 65.8 |
| Reference example A10 | A | — | Pb0.40 | 4.3 | 0.00198 | 100 | 0.281 |
| Example A109 | A | 0.30 | Mg0.03 | 2.5 | 0.00291 | 100 | 0.495 |
| Example A110 | A | 0.30 | Zr0.05 | 2.4 | 0.00666 | 100 | 2.35 |
| Example A111 | A | 0.30 | Sr0.005 | 2.6 | 0.0021 | 102 | 3.81 |
| Example A112 | A | 0.30 | Ba0.05 | 3.8 | 0.180 | 100 | 7.12 |

As Table AA4 depicts, the batteries by this invention have not less life than that of the lead-contained battery (Reference example A10) and have longer life than that of the batteries of Comparative examples.

EXAMPLE A113 TO A119, COMPARATIVE EXAMPLE A42 TO A45, REFERENCE EXAMPLE A11

Life test of batteries made of;
anode cans from anode active materials with different additives magnesium, zirconium, strontium, or barium, beside bismuth, to zinc.
Cathode compound with additives nickel 29 ppm, cobalt 4 ppm, and copper 8.6 ppm to manganese dioxide.
Result in Table AA5.

TABLE AA5

| | Cathode compound | Bismuth added amount | Added ingredient & amount | Corrosion decrease | Corrosion decrease unbiased variance value | Life relative value | Life relative value unbiased variance value |
|---|---|---|---|---|---|---|---|
| Comparative example A42 | B | 0.01 | — | 10.1 | 0.0801 | 74 | 61.2 |
| Comparative example A43 | B | 0.10 | — | 3.8 | 0.0161 | 100 | 3.15 |
| Example A113 | B | 0.20 | — | 2.6 | 0.0131 | 101 | 2.20 |
| Example A114 | B | 0.30 | — | 2.2 | 0.00581 | 100 | 0.980 |
| Example A115 | B | 0.40 | — | 1.8 | 0.00282 | 100 | 1.30 |
| Example A116 | B | 0.50 | — | 1.5 | 0.00691 | 100 | 0.81 |
| Example A117 | B | 0.70 | — | 1.3 | 0.00712 | 101 | 0.55 |
| Reference example A11 | B | — | Pb0.40 | 4.8 | 0.00192 | 100 | 4.21 |
| Example A118 | B | 0.30 | Mg0.03 | 3.0 | 0.00311 | 101 | 2.05 |
| Example A119 | B | 0.20 | Zr0.05 | 3.2 | 0.00911 | 100 | 2.99 |
| Comparative example A44 | B | 0.30 | Sr0.05 | 3.4 | 0.00283 | 97 | 5.12 |
| Comparative example A45 | B | 0.20 | Ba0.05 | 4.2 | 0.415 | 81 | 58.4 |

As Table AA5 depicts, the batteries by this invention have not less life than that of the lead-contained battery (Reference example A11) and have longer life than that of the batteries of Comparative examples.

EXAMPLE B

Following is a detailed description of an example of this invention.

Obtained was a battery anode zinc material from a lot of purity 99.99 percent by mass zinc ground metal which contained inevitable impurities, adding a specified amount of bismuth but none of lead. Zinc ground metal naturally and inevitably contains accompaniment impurities such as copper, iron, cadmium and lead on the ppm order. Zinc pellets of specified dimensions were made out of a zinc sheet which was processed from the zinc material ingot by hot rolling. From the pellets, zinc cans 0.35 mm thick with the bottom cover were fabricated by press forming the sheet to the equilateral hexagon zinc plate 31 mm diagonal length and 6 mm thickness; loading pressure 100 t, heat to the pellet 150°±30 degrees Centigrade. At this time Yokogawa Digital Heat Emission Thermometer 530 04, its laser pointer, was used to measure the temperature of the pellet surface in punching process. After deep-drawing checked was if finish of the cans O.K. or N.G and if any or no crack or dent. Further metal structure of the cans was inspected for cracks and metal condition.

Subsequently, R20 manganese dry batteries were manufactured with the fabricated zinc cans, followed by corrosion test of the anode zinc material, measuring crystal grain diameter, and evaluation of the battery characteristics.

(Measuring Method of Average Crystal Grain Diameter)

Following explains measuring method of average crystal grain diameter. Test samples were cut of the zinc cans at 15 mm below from the top-end, the can's opening, to look at the crystal structure of that region, and the zinc crystals composing the cross section of the region were measured for grain diameter.

Degreasing the sample with 10% NaOH solution and acetone, fixing it upright to expose the cut section with epoxy adhesive (trade brand: Araldite), and polishing the surface, the section was magnified 100 times by a polarizing microscope and was photographed by a digital still camera.

Measuring was done in such a way; count grain diameter of the crystals along a horizontal line on the image photographed; compute out the average crystal grain diameter in the region using Nikon's Stage Micrometer. The number of the test sample was 5. Average grain diameter was obtained from the line on 10 regions per each of 5 samples. To get variance, Standard Error of Mean was calculated out of 5 data of measurement result (average grain diameter) from each of 5 samples. The value was used for the index of variance.

(Corrosion Resistant Test of the Anode Zinc Can)

Following explains about corrosion resistant test of the material for the anode zinc can.

Cutting test samples (a piece 1.3 mm thick 1.0 mm width, 50.0 mm length) out of the zinc cans, the samples were polished at their surface and cross section to mirror face status with the sandpapers #400, #600, #800, #1000 and #1200, and were degreased in an Ultrasonic Wave Cleaner. The liquid used was of 10 percent by mass of NaOH and acetone. The degreased sample was weighed in 0.1 mg accuracy and then dipped into electrolyte in a constant temperature water chamber. Weight decrease of the sample after 66 hours in 45 degrees Centigrade was taken for decrease by corrosion or corrosion-decrease.

The electrolyte used for the test was made from zinc chloride 25 percent by mass and ammonium chloride 2 percent by mass, that is, a normal electrolyte composition. To it added was an amount of the standard solution of Ni, Co, and Cu for atomic absorbency method to adjust concentration of the electrolyte to be Ni 2.9 ppm, Co 0.40 ppm, and Cu 0.86 ppm. The electrolyte was bubbled for 10 minutes by argon gas to deter affect of unsolved oxygen. That completed the electrolyte. Six samples were tested to get average corrosion-decrease.

(3) Evaluation of Battery Characteristics

Three types of cathode compound were prepared mixing well those substances to be homogeneous; 50 mass parts of purity 92% above electrolytic manganese dioxide (impurity: copper below 0.0005 percent by mass, iron below 0.02 percent by mass, lead below 0.0005 percent by mass). 9 mass parts of acetylene black containing ash 0.01 percent by mass, and 50 mass parts of zinc dioxide adding 49 mass parts of the electrolyte referred in 0084 above. The electrolyte is a mixture of zinc chloride 25 percent by mass and ammonium chloride 2 percent by mass. The amount of impurities in the prepared cathode compound is equivalent to that low grade natural manganese dioxide elutes to electrolyte in a normal temperature during 1 year after being manufactured.

The separator prepared is a piece of craft paper coated with chemical starch of, cross linkage ether of cornstarch.

Using the abovementioned anode zinc materials, made out were R20 manganese dry batteries. The attached drawing 1 describes this type of battery. 1 refers to the anode zinc can, 2 the separator, 3 the cathode compound, 4 the carbon rod for collecting current, 5 the gasket, 6 the positive terminal, 7 the negative terminal, 8 the insulating tube, and 9 the outer can cover.

Asphalt seal material was coated the contact faces of the carbon rod 4 and the seal to shut out oxygen to enter through a gap between the press inserted carbon rod 4 and the gasket 5.

After storing the battery in a constant temperature chamber of 20 degrees Centigrade±2 degrees Centigrade for 10 days and further storing in a constant temperature chamber in 40 degrees Centigrade for 30 days, the batteries were discharged with a load of 40 ohm (Ω) for 4 hours a day in a room temperature. Subsequently evaluated was life characteristic at the time of 1.1V, and obtained was relative values to 100 the standard representing the characteristic of conventional and currently available batteries. The number of the samples was 9 of R20 made in this work.

EXAMPLE B1 TO B8, COMPARATIVE EXAMPLE B1 TO B2, AND REFERENCE EXAMPLE B1 & B2

With 20 samples of the battery, checked was crack, and measured were crystal grain diameter, corrosion decrease of the anode zinc material containing specified amount of bismuth added, and battery life by discharge under specified conditions. The results are shown in Table B1 herein below.

Likewise, for comparison check and measurement were conducted for the batteries of zinc cans formed in different temperature from the range of this invention and from the anode material without adding bismuth as to crack, grain diameter, corrosion decrease, and battery life.

Table B1 describes those results.

For comparative reference, foregoing test was done on a battery of a zinc can from the material with lead 0.02 percent by mass added as conventionally and currently done (Reference example B1), and another battery of a can from the material without adding lead but adding indium 0.01 percent by mass (Example B2).

The result shows corrosion decrease of less than or equal to 3.9 mg for every example, as compared to 12.0 mg of the examples of grain diameter out of the range of this invention. It is obvious that corrosion resistance was substantially improved in the examples, which also evidences very few cracks endorsing superior process-ability. And life of the batteries by this Invention was not less than or equal to that of conventional batteries from lead-added zinc material.

EXAMPLE B'

Following is detailed description of an example. Obtained was a battery anode zinc material from a lot of zinc ground metal purity 99.99% without adding lead and adding specified amount of bismuth. The zinc ground metal inevitably contained impurities such as copper, iron, and cadmium on the ppm order. Hot rolling the zinc ingot to a sheet, and rolling further the sheet to 0.5 mm thick, coating conductive paint, drying up, and then the sheet was punched out to required shape. At this juncture, Yokogawa Digital Heat Emission Thermometer 530 04, its laser pointer was used to measure the temperature of the sheet surface in rolling process. After process the zinc sheet was checked in surface condition, dent, and crack using a microscope. Further, metal structure of the sheet was looked into for cracks and metal condition. Subsequently 6F22 quadrilateral laminated manganese dry batteries were made using the processed zinc plates, followed by corrosion test of the zinc plates, measurement of crystal grain diameter, and characteristic evaluation of the battery.

(Measuring Method of Average Crystal Grain Diameter)

Following explains measuring method of average crystal grain diameter. Test samples were cut out of the zinc plates horizontally to a flat face for looking at the crystal structure at cross section, and grain diameter of the zinc crystals composing the cross-section were measured. Degreasing the sample with 10% NaOH solution and acetone, fixing it upright to expose the cut section with epoxy adhesive (trade brand: Araldite), and polishing the surface, the section was magnified 100 times by a polarizing microscope and was photographed by a digital still camera. Measuring was done in such a way; measuring grain diameter of the crystals along a horizontal line on the image photographed; computing out the

TABLE B1

|  | Bismuth amount (Mg amount) | Average grain diameter | Standard error | Corrosion decrease | Material temperature in processing can | Number of crack | Life relative value |
|---|---|---|---|---|---|---|---|
| Reference example B1 | Pb0.2 | 30.3 | 1.17 | 4.8 | 180 | 0 | 100 |
| Reference example B2 | In0.01 | 26.7 | 1.23 | 21.0 | 210 | 3 | 66 |
| Example B1 | 0.1 | 20.6 | 0.92 | 3.8 | 162 | 0 | 101 |
| Example B2 | 0.3 | 12.7 | 0.049 | 2.0 | 211 | 0 | 101 |
| Example B3 | 0.3 | 12.7 | 0.049 | 2.0 | 230 | 1 | 101 |
| Example B4 | 0.5 | 10.8 | 0.033 | 1.3 | 203 | 0 | 101 |
| Example B5 | 0.7 | 7.8 | 0.023 | 1.1 | 182 | 0 | 102 |
| Example B6 | 0.8 | 7.7 | 0.033 | 1.1 | 118 | 0 | 101 |
| Example B7 | 0.3 (Mg0.0003) | 12.9 | 0.067 | 2.0 | 158 | 0 | 100 |
| Example B8 | 0.3 (Mg0.002) | 12.6 | 0.071 | 2.1 | 155 | 0 | 100 |
| Example B9 | 0.3 (Mg0.003) | 12.4 | 0.072 | 2.0 | 154 | 0 | 101 |
| Comparative example B1 | 0.3 (Mg0.004) | — | — | — | 155 | 17 | — |
| Comparative example B2 | — | 48.2 | 1.33 | 12.0 | 155 | 0 | 69 | average crystal grain diameter in the region using Nikon's Stage Micrometer. The number of the test sample was 5. Average grain diameter was obtained from a line on 10 regions per each of 5 samples. To get variance, Standard Error of Mean was calculated out of 5 data of measurement (average grain diameter) from each of 5 samples. The value was used for the index of variance.

(Corrosion Resistant Test of the Anode Zinc Sheet)

Following explains about corrosion resistant test of the material for the anode zinc sheet.

Cutting out test samples (a piece 0.5 mm thick 10.0 mm width, 50.0 mm length) of the zinc plates horizontally to the flat face, the samples were polished at their surface and cross section to mirror face status with the sand papers #400, #600, #800, #1000 and #1200, and were degreased in an ultrasonic cleaner. The liquid used were 10 percent by mass of NaOH and acetone. The degreased sample was weighed in 0.1 mg accuracy and then dipped into electrolyte in a constant temperature water chamber prepared. Weight decrease of the sample after 66 hours in 45 degrees Centigrade was taken for corrosion-decrease.

The electrolyte used for the test was made from zinc chloride 25 percent by mass and ammonium chloride 2 percent by mass, that is, a normal electrolyte composition. To it added was an amount of the standard solution of Ni, Co, and Cu for atomic absorbency method to adjust concentration of the electrolyte to be Ni 2.9 ppm, Co 0.40 ppm, and Cu 0.86 ppm. The electrolyte was bubbled for 10 minutes by argon gas to deter affect of unsolved oxygen.

Six samples were tested to get average corrosion-decrease.

(3) Evaluation of Battery Characteristics

Three types of cathode compound were prepared mixing well those substances to be homogeneous: 50 mass parts of purity 92% above electrolytic manganese dioxide (impurity: copper below 0.0005 percent by mass, iron below 0.02 percent by mass, lead below 0.0005 percent by mass), 9 mass parts of acetylene black containing ash below 0.01 percent by mass, and 26 percent by mass of zinc dioxide adding 49 parts by mass of the electrolyte referred in 0084 above. The electrolyte is a mixture of zinc chloride 25 percent by mass and ammonium chloride 2 percent by mass, and the amount of impurities in the prepared cathode compound is equivalent to that low grade natural manganese dioxide elutes to electrolyte in a normal temperature during 1 year after being manufactured.

The separator prepared is a piece of craft paper coated with chemical starch of cross linkage ether of cornstarch.

Using the abovementioned anode zinc materials, made out were 6F22, manganese dry batteries. The attached drawing 2 describes this type of battery.

After storing the battery thus made in a constant temperature chamber of 20 degrees Centigrade±2 degrees Centigrade for 10 days and further storing in a constant temperature chamber in 40 degrees Centigrade for 30 days, the battery was discharged with a load of 620 ohm (Ω) for 2 hours a day in a room temperature. Subsequently evaluated was life characteristic at the time of 6.6V, and obtained was relative values to 100 the standard caliber.

The number of the samples for evaluation was 9 pieces of 6F22 battery.

EXAMPLE B9 TO B16, COMPARATIVE EXAMPLE B3 TO B4, REFERENCEEXAMPLE B3 & B4

With 20 samples of the battery, checked and measured were crack, crystal grain diameter, corrosion decrease of the anode zinc material containing specified amount of bismuth added, and battery life by discharge under specified conditions. The results are shown in Table B'1 herein below.

Likewise, for comparison measurement was conducted for the batteries of thin zinc sheets rolled in a different temperature from the range of this invention and from the anode material without adding bismuth in respect of crack, grain diameter, corrosion-decrease, and battery life.

Table B'1 describes those results.

Also for comparative reference, foregoing test was done on a battery of a zinc sheet from the material with lead 0.02 percent by mass added as conventionally and currently done (Reference example B3), and another battery of a sheet from the material without adding lead but adding indium 0.01 percent by mass (Example B4).

TABLE BB1

|  | Bismuth amount (Mg amount) | Average grain diameter | Standard error | Corrosion decrease | Material temperature in rolling | Number of crack | Life relative value |
| --- | --- | --- | --- | --- | --- | --- | --- |
| Reference example B3 | Pb0.2 | 30.1 | 1.20 | 4.9 | 181 | 0 | 100 |
| Reference example B4 | In0.01 | 25.7 | 1.31 | 21.2 | 212 | 7 | 71 |
| Example B10 | 0.1 | 20.1 | 1.00 | 3.9 | 171 | 0 | 100 |
| Example B11 | 0.3 | 12.8 | 0.051 | 2.2 | 213 | 0 | 101 |
| Example B12 | 0.5 | 11.2 | 0.033 | 1.4 | 212 | 0 | 100 |
| Example B13 | 0.7 | 8.1 | 0.021 | 1.2 | 190 | 0 | 101 |
| Example B14 | 0.8 | 7.9 | 0.041 | 1.3 | 119 | 0 | 101 |
| Example B15 | 0.3 (Mg0.0003) | 12.8 | 0.061 | 2.1 | 181 | 0 | 100 |
| Example B16 | 0.3 (Mg0.003) | 12.7 | 0.078 | 2.5 | 167 | 0 | 100 |
| Example B17 | 0.3 (Mg0.03) | 12.5 | 0.073 | 2.2 | 168 | 0 | 101 |
| Comparative example B3 | 0.3 (Mg0.04) | — | — | — | 169 | 9 | — |
| Comparative example B4 | — | 49.1 | 1.41 | 13.5 | 160 | 0 | 75 |

The result shows corrosion-decrease less than or equal to 3.9 mg for every example, as compared to 13.5 mg of the examples of grain diameter out of the range of this invention. It is obvious that corrosion resistance was substantially improved in the examples, which also evidences very few cracks endorsing superior process-ability.

And life of the batteries by this invention was not less than or equal to that of conventional batteries from lead-added zinc material.

EXAMPLE C, EXAMPLE C1 TO C4,
COMPARATIVE EXAMPLE C1

Made was a bar of ingot 200 m wide, 10 mm thick, 750 mm long from a lot of 99.5 percent by mass pure zinc containing impurities: lead below 70 ppm after casting and cooling down, cadmium below 20 ppm, iron below 30 ppm, copper 10 ppm, and antimony below 1 ppm, adding bismuth by the amount shown in Table C1 below, melting together in 470°±50 degrees Centigrade, and cooling down to a room atmospheric temperature. Rolling the cast bar, after cooling, in the surface temperature 150±30 degrees Centigrade to a sheet 4.5±0.2 mm. Subsequently the sheet was punched to hexagonal pellets. The pellets were placed onto a die with a round hole, press inserted a cylindrical punch sharply, and were deep-drawn by impact to form cylindrical cans. The cans were trimmed to outer diameter 31.4±0.1 mm, bottom thickness 0.42±0.4 mm, and total height 54.1±0.2 mm, the dimensions of a manganese dry battery.

Using the anode cans, the cathode compound, and separators, two of which are explained herein below, manufactured were R20 manganese dry batteries.

The Cathode Compound:
- 53 mass parts of manganese dioxide, purity above 78 percent by mass (impurity: Fe below 5.0%, Cu below 0.06%, nickel below 0.08%, cobalt below 0.05%, and arsenic below 0.01%)
- 8 mass parts of acetylene black containing ash below 0.1 percent by mass
- 39 mass parts of electrolyte containing 26 percent by mass zinc chloride plus 1.5 percent by mass ammonium chloride All mixed and churned wet, and homogeneous compound was prepared.

The Separator
The separator prepared is a piece of craft paper coated with chemical starch of cross linkage ether of cornstarch.

TABLE C1

|  | Bi Mass concentration (percent by mass) | Average grain diameter (μm) | Standard error of Mean (S.E.M) | O/I ratio | Corrosion decrease (mg) | Material hardness (HV) |
| --- | --- | --- | --- | --- | --- | --- |
| Example C1 | 0.08 | 24.8 | 0.95 | 1.40 | 4.0 | 40 |
| Example C2 | 0.1 | 21.1 | 0.92 | 1.41 | 3.8 | 40 |
| Example C3 | 0.3 | 12.7 | 0.049 | 1.15 | 2.0 | 41 |
| Example C4 | 0.7 | 7.8 | 0.023 | 1.04 | 1.1 | 41 |
| Comparative example C1 | 0.05 | 40.3 | 1.15 | 1.67 | 5.8 | 32 |

COMPARATIVE EXAMPLE C2 & C3

Also fabricated were manganese batteries adding lead to anode material by the specified amount (Pb) in Table C2, without adding any bismuth, otherwise under the same conditions as for examples in Table C1 above.

TABLE C2

|  | Pb Mass concentration (percent by mass) | Average grain diameter (μm) | Standard error of Mean (S.E.M) | O/I ratio | Corrosion decrease (mg) | Material hardness (HV) |
| --- | --- | --- | --- | --- | --- | --- |
| Comparative example C2 | 0.2 | 30.3 | 1.17 | 1.52 | 4.8 | 44 |
| Comparative example C3 | 0.4 | 14.8 | 1.58 | 1.46 | 4.2 | 45 |

EXAMPLE C5 & C6, COMPARATIVE EXAMPLE C4

Also fabricated were manganese dry batteries adding 0.3 percent by mass bismuth and magnesium by the specified amount in Table C3 to anode material, otherwise under the same conditions as for examples stated above. And also, as comparative example C4, fabricated were manganese dry batteries adding 0.3 percent by mass bismuth and 0.005 percent by mass magnesium to anode material.

TABLE C3

| | Mg Mass concentration (percent by mass) | Average grain diameter (μm) | Standard error of Mean (S.E.M) | O/I ratio | Corrosion decrease (mg) | Material hardness (HV) |
|---|---|---|---|---|---|---|
| Example C5 | 0.0003 | 12.9 | 0.067 | 1.18 | 2.0 | 44 |
| Example C6 | 0.003 | 12.4 | 0.072 | 1.21 | 2.1 | 47 |
| Comparative example C4 | 0.005 | Material friable, no useable sample obtained. | | | | |

(Measuring Method of Average Crystal Grain Diameter)

Following explains measuring method of average crystal grain diameter.

Test samples were cut out of the zinc cans at 15 mm below from the top-end, the can's opening edge to look at the crystal structure of the region, and the zinc crystals composing the cross-section of the region were measured in grain diameter. Degreasing the sample with 10% NaOH solution and acetone, fixing it upright to expose the cut section with epoxy adhesive (trade brand: Araldite), and polishing the surface, the section was magnified 100 times by a polarizing microscope and was photographed by a digital still camera. Measuring was done in such a way; counting grain diameter of the crystals along a horizontal line on the image photographed; computing out the average crystal grain diameter in the region using Nikon's Stage Micrometer. The number of the test sample was 5. Average grain diameter was obtained from the line on 10 regions per each of 5 samples.

Measurement was conducted on the metal structure within a region 200 μm from the inner wall surface and from the outer wall surface. The ratio of two average grain diameter was computed out. To get variance, Standard Error of Mean was calculated out of 5 data of measurement result (average grain diameter) from each of 5 samples. The value was used for the index of variance.

Those results are indicated in Table C1, C2, and C3.

(Corrosion Resistant Test of the Anode Zinc Can)

Following explains about carbon resistant test of the material for the anode zinc can.

Cutting out test samples (a piece 1.3 mm thickness 1.0 mm width, 50.0 mm length) of the zinc cans, the samples were polished at their surface and cross section to mirror face status with the sandpapers #400, #600, #800, #1000 and #1200, and were degreased in an Ultrasonic Cleaner. The liquid used were 10 percent by mass of NaOH and acetone. The degreased sample was weighed in 0.1 mg accuracy and then dipped into electrolyte in a constant temperature water chamber. Weight decrease of the sample after 66 hours in 45 degrees Centigrade was taken for corrosion decrease.

The electrolyte used for the test was made from zinc chloride 25 percent by mass and ammonium chloride 2 percent by mass, that is, a normal electrolyte composition. To it added was an amount of the standard solution of Ni, Co, and Cu for atomic absorbancy method to adjust concentration of the electrolyte to be Ni 2.9 ppm, Co 0.40 ppm, and Cu 0.86 ppm. The electrolyte was bubbled for 10 minutes by argon gas to deter affect of unsolved oxygen. 6 samples were tested to get average corrosion decrease.

The results are located in Table C1, C2, and C3.

(Measuring Hardness of Anode Cans)

Cutting 5 samples of 20 mm² piece out of the central area of the anode zinc cans, Vickers hardness of each sample was measured, and average value was calculated out.

The results can be seen in Table C1, C2, and C3.

(Leakage Proof Test)

Having placed R20 batteries still in a constant temperature chamber in 20±2 degrees Centigrade and humidity 65±20%, and event of leakage was checked by excess discharge for 60 days with 20Ω±5% tolerance of metal coated carbon resistor widely available on the market.

The Sample: 100 Pieces of the Battery

The result is shown in Table C4 below.

TABLE C4

| | Bi Mass concentration (percent by mass) | Number of days discharged & leakage happening % | | |
|---|---|---|---|---|
| | | 20 d | 40 d | 60 d |
| Example C7 | 0.08 | 0 | 0 | 0 |
| Example C8 | 0.1 | 0 | 0 | 0 |
| Example C9 | 0.3 | 0 | 0 | 0 |
| Example C10 | 0.7 | 0 | 0 | 0 |
| Comparative example C5 | 0.05 | 0 | 6 | 14 |

COMPARATIVE EXAMPLE C6 & C7

Also fabricated were manganese dry batteries adding lead to anode material by the specified amount (Pb) in Table C5, without adding any bismuth, otherwise under the same conditions as for examples stated above.

TABLE C5

| | Pb Mass concentration (percent by mass) | Number of days discharged & leakage happening % | | |
|---|---|---|---|---|
| | | 20 d | 40 d | 60 d |
| Comparative example C6 | 0.2 | 0 | 0 | 10 |
| Comparative example C7 | 0.4 | 0 | 0 | 4 |

EXAMPLE C11 & C12

Also fabricated were manganese dry batteries adding 0.3 percent by mass bismuth and magnesium by the specified amount in Table C6 to anode material, otherwise under the same conditions as for the examples stated above.

TABLE C6

| | Mg Mass concentration (percent by mass) | Number of days discharged & leakage happening % | | |
|---|---|---|---|---|
| | | 20 d | 40 d | 60 d |
| Example C11 | 0.0003 | 0 | 0 | 0 |
| Example C12 | 0.003 | 0 | 0 | 0 |

EXAMPLE C', EXAMPLE C13 TO C16, COMPARATIVE EXAMPLE C8

Made was a bar of ingot 200 m wide, 10 mm thick, 750 mm long from a lot of 99.5 percent by mass pure zinc containing impurities: lead below 70 ppm after casting and cooling down, cadmium below 20 ppm, iron below 30 ppm, copper 10 ppm, and antimony below 1 ppm, adding bismuth amount shown in Table C'1 below, melting together in 470°±50 degrees Centigrade, and cooling down to a room atmospheric temperature. Rolling the cast bar, after cooling, in the surface temperature 150±30 degrees Centigrade to a sheet 4.5±0.2 mm. The sheet was further rolled in the surface temperature in 120 degrees Centigrade to 210 degrees Centigrade to a 0.5 mm zinc sheet. Subsequently the sheet was coated with conductive paint, dried up, and punched to a specified shape for an anode zinc plates of 6F22 battery.

Using the zinc plate, cathode compound, and a separator, two of which explained herein below, manufactured were 6F22 manganese dry batteries.

The Cathode Compound:
53 mass parts manganese dioxide, purity above 78 percent by mass (impurity: Fe below 5.0%, Cu below 0.06%, nickel below 0.08%, cobalt below 0.05%, and arsenic below 0.01%)
8 mass parts acetylene black containing ash below 0.1 percent by mass
39 mass parts electrolyte containing 26 percent by mass zinc chloride plus 1.5 percent by mass ammonium chloride All mixed and churned wet, and homogeneous compound was prepared.

The Separator
The separator prepared is a piece of craft paper coated with chemical starch of cross linkage ether of cornstarch.

TABLE CC1

| | Bi Mass concentration (percent by mass) | Average grain diameter (μm) | Standard error of Mean (S.E.M) | Corrosion decrease (mg) | Material hardness (HV) |
|---|---|---|---|---|---|
| Example C13 | 0.08 | 25.1 | 1.00 | 5.1 | 43 |
| Example C14 | 0.1 | 21.3 | 0.98 | 3.3 | 45 |
| Example C15 | 0.3 | 12.8 | 0.061 | 2.1 | 42 |
| Example C16 | 0.7 | 8.1 | 0.031 | 1.0 | 43 |
| Comparative example C8 | 0.05 | 45.6 | 1.28 | 6.1 | 35 |

COMPARATIVE EXAMPLE C9 C10

Also fabricated were 6F22 manganese dry batteries adding lead to anode material by the specified amount (Pb) in Table CC2, without adding any bismuth, otherwise under the same conditions as for examples stated above.

TABLE CC2

| | Pb Mass concentration (percent by mass) | Average grain diameter (μm) | Standard error of Mean (S.E.M) | Corrosion decrease (mg) | Material hardness (HV) |
|---|---|---|---|---|---|
| Comparative example C9 | 0.2 | 30.5 | 1.21 | 5.1 | 41 |
| Comparative example C10 | 0.4 | 16.2 | 1.61 | 4.3 | 43 |

EXAMPLE C17 & C18, COMPARATIVE EXAMPLE C11

Also fabricated were manganese dry batteries adding 0.3 percent by mass bismuth and magnesium by the specified amount in Table C3 to anode material, otherwise under the same conditions as for examples stated above. And also, as comparative example C4, fabricated were 6F22 manganese dry batteries adding 0.3 percent by mass bismuth and 0.005 percent by mass magnesium to anode material.

TABLE CC3

| | Mg Mass concentration (percent by mass) | Average grain diameter (μm) | Standard error of Mean (S.E.M) | Corrosion decrease (mg) | Material hardness (HV) |
|---|---|---|---|---|---|
| Example C17 | 0.0003 | 13.1 | 0.071 | 2.1 | 42 |
| Example C18 | 0.03 | 12.7 | 0.077 | 2.3 | 54 |
| Comparative example C11 | 0.04 | Material friable, no useable sample obtained. | | | |

(Measurement of Average Grain Diameter)

Following method of measuring was done as to average crystal grain diameter of anode plates for 6F22 manganese dry batteries in the examples and the comparative examples.

Test samples were cut out of the zinc plates horizontally to the flat face to look at the crystal structure of the region, and the zinc crystals composing the cross section of the region were measured for grain diameter.

Degreasing the sample with 10% NaOH solution and acetone, fixing it upright to expose the cut section with epoxy adhesive (trade brand: Araldite), and polishing the surface, the section was magnified 100 times by a polarizing microscope and was photographed by a digital still camera. Measuring was done in such a way; counting grain diameter of the crystals along a horizontal line on the image photographed; computing out the average crystal grain diameter in the region using Nikon's Stage Micrometer. The number of the test sample was 5. Average grain diameter was obtained from 10 regions per each of 5 samples.

(Corrosion Resistant Test of the Anode Zinc Plate)

Following explains about corrosion resistant test of the material for the anode zinc plates.

Cutting test samples (a piece 0.5 mm thick 1.0 mm width, 50.0 mm length) out of the zinc plates, the samples were polished at their surface and cross section to mirror face status with the sand papers #400, #600, #800, #1000 and #1200, and were degreased in an Ultrasonic Cleaner. The liquid used were 10 percent by mass of NaOH and acetone. The degreased sample was weighed in 0.1 mg, accuracy and then dipped into electrolyte in a constant temperature water chamber. Weight decrease of the sample after 66 hours in 45 degrees Centigrade was taken for corrosion decrease.

The electrolyte used for the test was made from zinc chloride 25 percent by mass and ammonium chloride 2 percent by mass, that is, a normal electrolyte composition. To it added was an amount of the standard solution of Ni, Co, and Cu for atomic absorbancy method to adjust concentration of the electrolyte to be Ni 2.9 ppm, Co 0.40 ppm, and Cu 0.86 ppm. The electrolyte was bubbled for 10 minutes by argon gas to deter affect of unsolved oxygen. 6 samples were tested to get average corrosion decrease.

The results are shown in Table CC1, CC2, and CC3.

(Measuring Hardness of Anode Plates)

Cutting 5 samples out of the anode zinc plates, Vickers hardness of each sample was measured, and average value was calculated out.

The results can be seen in Table CC1, CC2, and CC3.

(Leakage Proof Test)

Having placed fabricated 6F22 batteries still in a constant temperature chamber in 20±2 degrees Centigrade and humidity 65±20%, and event of leakage was checked by excess discharge for 60 days with 620Ω±5% tolerance metal coated carbon resistor widely available on the market.

The sample number: 100

The result is shown in Table CC4 below.

TABLE CC4

| | Bi Mass concentration | Number of days discharged & leakage happening % | | |
|---|---|---|---|---|
| | (percent by mass) | 20 d | 40 d | 60 d |
| Example C19 | 0.08 | 0 | 0 | 0 |
| Example C20 | 0.1 | 0 | 0 | 0 |
| Example C21 | 0.3 | 0 | 0 | 0 |
| Example C22 | 0.7 | 0 | 0 | 0 |
| Comparative example C12 | 0.05 | 0 | 3 | 7 |

COMPARATIVE EXAMPLE C13 & C14

Also fabricated were manganese dry batteries adding lead to anode material by the specified amount (Pb) in Table CC5, without adding any bismuth, otherwise under the same conditions as for examples stated above.

TABLE CC5

| | Pb Mass concentration | Number of days discharged & leakage happening % | | |
|---|---|---|---|---|
| | (percent by mass) | 20 d | 40 d | 60 d |
| Comparative example C13 | 0.2 | 0 | 0 | 5 |
| Comparative example C14 | 0.4 | 0 | 0 | 1 |

EXAMPLE C23 & C24

Also fabricated were manganese dry batteries adding 0.3 percent by mass bismuth and magnesium by the specified amount in Table CC6 to anode material, otherwise under the same conditions as for the examples stated above.

TABLE CC6

| | Mg Mass concentration | Number of days discharged & leakage happening % | | |
|---|---|---|---|---|
| | (percent by mass) | 20 d | 40 d | 60 d |
| Example C23 | 0.0003 | 0 | 0 | 0 |
| Example C24 | 0.003 | 0 | 0 | 0 |

(Evaluation)

As foregoing examples and comparative examples evidence, this invention realizes manufacturing battery anode zinc cans and plates and batteries thereby without using lead, in the same material hardness equivalent to that of alloy wherein lead is compounded, and with less material decrease due to corrosion as compared to conventionally made zinc cans and plates. It is a discovery of this invention that decrease from corrosion and material hardness can be improved by compounding bismuth and adding magnesium to zinc alloy.

ADVANTAGE OF THIS INVENTION

As described above, this invention facilitates to make and supply practical and highly reliable anode zinc material, parts, and battery containing far much less lead pollutant as compared to conventional and currently supplied batteries, while the materials keep enough process-ability in addition to optimum material hardness, and the batteries have better corrosion resistance and leakage proof property.

Figure 1:
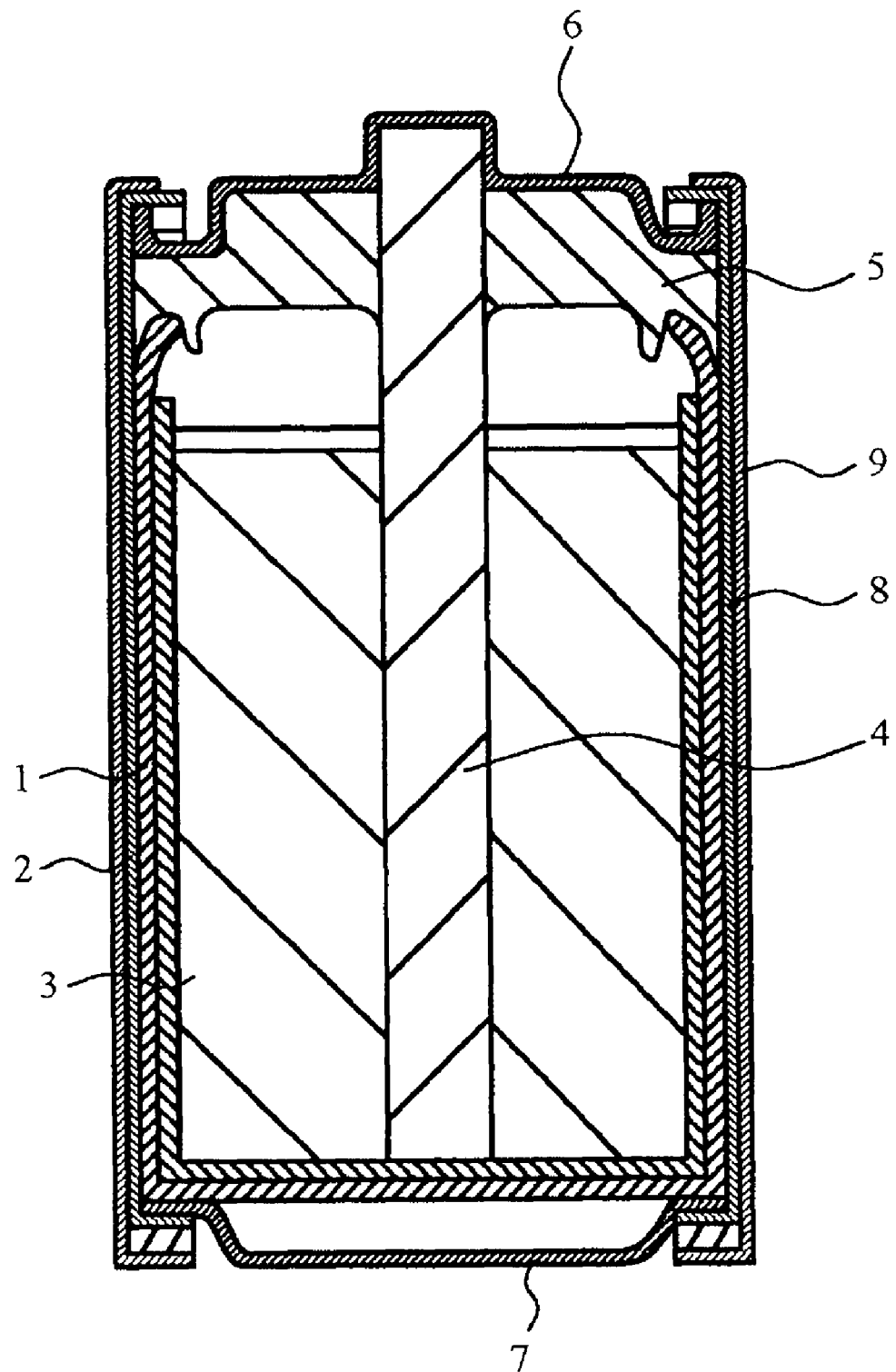
FIG. 1 depicts a brief cross sectional view of a manganese dry battery.

The digit 1 in FIG. 1 refers to the anode zinc can, 2 the separator, 3 the cathode compound, 4 the carbon rod current collector, 5 the gasket, 6 the positive terminal, 7 the negative terminal, 8 the insulation tube, and 9 the outer can.

Figure 2:
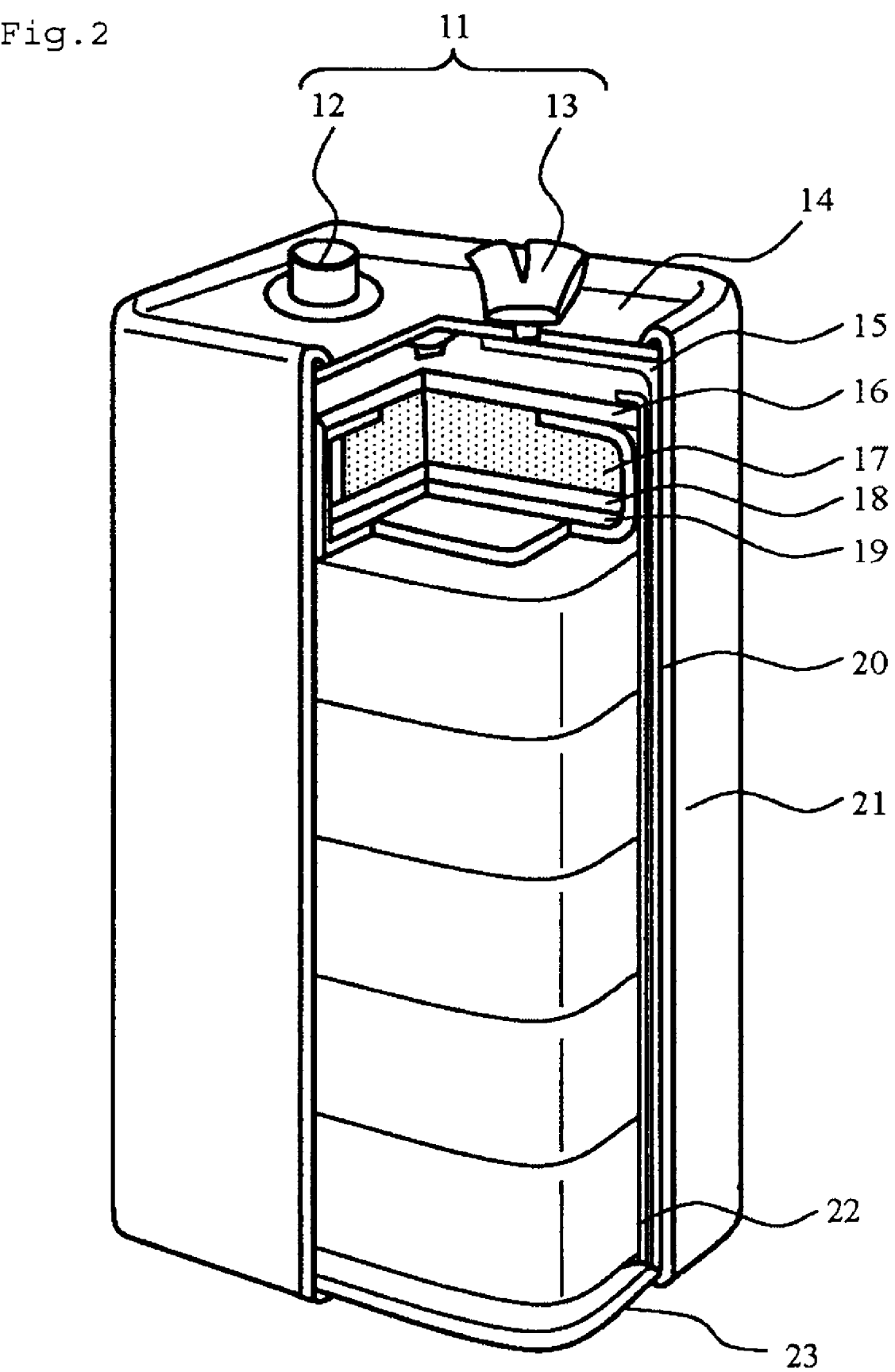
FIG. 2 depicts a brief cross sectional view of a quadrilateral laminated manganese dry battery.

The digit 11 in FIG. 2 refers to the terminal, 12 the positive terminal (+), 13 the negative terminal (−), 14 the upper insulation strip, 15 the leading strip, 16 the electrode (current draw out) terminal, 17 the cathode compound, 18 the separator, 19 the zinc plate, 20 the carbon film, 21 the outer can, 22 the heat-shrink tube, and 23 the lower insulation strip.

What is claimed is:

1. A manganese dry battery comprising:
   an anode zinc can with a covered bottom and a cylindrical can wall made from an anode active material which comprises:
   98.7 percent by mass or more and 99.8 percent by mass or less of zinc,
   0.01 percent by mass or more and 0.7 percent by mass or less of bismuth,
   1 ppm or less of antimony,
   70 ppm or less of lead,
   20 ppm or less of cadmium;
   wherein the anode zinc can structure in a cross section of said can wall being cut in a height and thickness direction consists of crystals of 8 μm or more and 25 μm or less of average grain diameter as measured on a projected image of the crystals on a horizontal line in the thickness direction; wherein crystal grain diameter at the outer wall of the zinc can is 1.0 to 1.4 times the crystal grain diameter at the inner wall; and wherein the zinc can is produced by deep drawing a pellet of the anode active material at a temperature ranging from 120 to 210° C.

2. The manganese dry battery of claim 1, further comprising:
   natural manganese dioxide as a cathode active material.

3. The manganese dry battery of claim 1 further comprising:
   electrolytic manganese dioxide as a cathode active material.

4. The manganese dry battery according to claim 1, wherein the anode active material further comprises from 0.0003 percent by mass to 0.003 percent by mass of magnesium.

5. The manganese dry battery according to claim 2, wherein the anode active material further comprises from 0.0003 percent by mass to 0.003 percent by mass of magnesium.

6. The manganese dry battery according to claim 3, wherein the anode active material further comprises from 0.0003 percent by mass to 0.003 percent by mass of magnesium.

7. The manganese dry battery of claim 1, wherein said anode zinc can is made of a zinc alloy that further comprises from 0.0003 percent by mass to 0.003 percent by mass of magnesium.

8. The manganese dry battery of claim 1, wherein said anode zinc can is made of a zinc alloy that further comprises more than or equal to 0.001 percent by mass and less than or equal to 0.05% by mass of at least one element selected from the group consisting of zirconium, strontium, barium, indium, and aluminum.

9. A manganese dry battery comprising:
   a cathode comprising an active material containing manganese,
   an electrolyte containing zinc chloride and ammonium chloride, and
   an anode that is a zinc can with a covered bottom and a cylindrical can wall made from an anode active material which comprises:
   98.7 percent by mass or more and 99.8 percent by mass or less of zinc,
   0.01 percent by mass or more and 0.7 percent by mass or less of bismuth,
   1 ppm or less of antimony,
   70 ppm or less of lead,
   20 ppm or less of cadmium;
   wherein the zinc can wall when cut longitudinally produces a cross-section made up of crystals having an average grain diameter ranging from 8 μm to 25 μm; wherein crystal grain diameter at the outer wall of the zinc can is 1.0 to 1.4 times the crystal grain diameter at the inner wall; and wherein the zinc can is produced by deep drawing a pellet of the anode active material at a temperature ranging from 120 to 210° C.

10. The manganese dry battery of claim 9, wherein said zinc can surrounds the separator, cathode and a carbon rod current collector.

11. The manganese dry battery of claim 9, wherein said zinc can is surrounded by an insulation tube and an outer can.

* * * * *